(12) United States Patent
Casey et al.

(10) Patent No.: US 9,996,825 B1
(45) Date of Patent: Jun. 12, 2018

(54) ELECTRONIC DEVICE ENABLED PAYMENTS

(75) Inventors: Brandon J. Casey, San Jose, CA (US); Erik Cressall, San Jose, CA (US); Dylan Ryder-Loomis, Berkeley, CA (US)

(73) Assignee: APPLE INC., Cupertino, CA (US)

( * ) Notice: Subject to any disclaimer, the term of this patent is extended or adjusted under 35 U.S.C. 154(b) by 1636 days.

(21) Appl. No.: 12/544,935

(22) Filed: Aug. 20, 2009

(51) Int. Cl.
*G06Q 40/00* (2012.01)
*G06Q 20/10* (2012.01)

(52) U.S. Cl.
CPC ......... *G06Q 20/102* (2013.01); *G06Q 20/108* (2013.01)

(58) Field of Classification Search
CPC .... G06Q 40/00; G06Q 20/102; G06Q 20/108; G06Q 20/40
USPC ...................................... 705/35–38
See application file for complete search history.

(56) References Cited

U.S. PATENT DOCUMENTS

| | | | |
|---|---|---|---|
| 5,953,710 A | 9/1999 | Fleming | |
| 6,021,397 A * | 2/2000 | Jones et al. | 705/36 R |
| 6,353,811 B1 | 3/2002 | Weissman | |
| 6,609,113 B1 | 8/2003 | O'Leary et al. | |
| 6,690,113 B1 * | 2/2004 | Ng | 315/56 |
| 6,726,092 B2 | 4/2004 | Goldberg et al. | |
| 6,749,114 B2 | 6/2004 | Madani | |
| 6,771,981 B1 | 8/2004 | Zalewski et al. | |
| 6,903,681 B2 | 6/2005 | Fans | |
| 6,913,191 B2 | 7/2005 | Goldberg et al. | |
| 7,133,659 B2 | 11/2006 | Zalewski et al. | |
| 7,155,199 B2 | 12/2006 | Zalewski et al. | |
| 7,249,092 B2 | 7/2007 | Dunn et al. | |

(Continued)

FOREIGN PATENT DOCUMENTS

| | | |
|---|---|---|
| EP | 1696626 | 8/2006 |
| JP | 2007323613 | 12/2007 |

OTHER PUBLICATIONS

Ilium Software, "Users Guide and Reference: Version 6.1," Jul. 2008 (available electronically at: www.iliumsoft.com/dl/doc/eWallet.pdf (accessed Apr. 9, 2009)).

(Continued)

*Primary Examiner* — Lalita M Hamilton
(74) *Attorney, Agent, or Firm* — Polsinelli LLP

(57) ABSTRACT

Payment transactions may be initiated by entering payment information, such as an amount, source, and recipient, through a graphical user interface (GUI) of an electronic device. The electronic device may transmit the payment information to a payment processor, such as a third party provider, bank, or the like, that may subsequently transmit an authorization request to an electronic device associated with the recipient. In certain embodiments, the recipient may identify a payment account and transmit the account information with the authorization to the payment processor. Upon receiving the authorization, the payment processor may transmit recipient identification information to the payor's electronic device. The payor may then confirm the identity of the payment recipient and confirm payment. Upon receiving the confirmation, the payment processor may process the payment. In other embodiments, certain authorizations and/or confirmations may be omitted, allowing more instantaneous payments to occur.

26 Claims, 14 Drawing Sheets

(56) References Cited

U.S. PATENT DOCUMENTS

| | | | |
|---|---|---|---|
| 7,331,518 B2 | 2/2008 | Rable | |
| 7,333,947 B2 | 2/2008 | Wiebe et al. | |
| 7,357,310 B2 | 4/2008 | Calabrese et al. | |
| 7,375,652 B2 | 5/2008 | Reeves et al. | |
| 7,546,944 B2 | 6/2009 | Goldberg et al. | |
| 2001/0042785 A1* | 11/2001 | Walker et al. | 235/379 |
| 2002/0082995 A1 | 6/2002 | Christie, IV | |
| 2003/0135463 A1 | 1/2003 | Brown | |
| 2003/0028481 A1 | 2/2003 | Flitcroft et al. | |
| 2004/0034598 A1 | 2/2004 | Robinson | |
| 2004/0083394 A1 | 4/2004 | Brebner | |
| 2004/0117302 A1* | 6/2004 | Weichert et al. | 705/40 |
| 2005/0246278 A1 | 11/2005 | Gerber et al. | |
| 2006/0006226 A1 | 1/2006 | Fitzgerald et al. | |
| 2006/0010042 A1 | 1/2006 | Gianakis et al. | |
| 2006/0031162 A1 | 2/2006 | Brundage et al. | |
| 2006/0074698 A1 | 4/2006 | Bishop et al. | |
| 2006/0085357 A1 | 4/2006 | Pizarro | |
| 2006/0105742 A1 | 5/2006 | Kim et al. | |
| 2006/0131390 A1 | 6/2006 | Kim | |
| 2007/0118475 A1 | 5/2007 | Picciallo et al. | |
| 2007/0255653 A1* | 11/2007 | Tumminaro | G06Q 20/10 705/39 |
| 2007/0288371 A1 | 12/2007 | Johnson | |
| 2008/0006685 A1 | 1/2008 | Rackley, III et al. | |
| 2008/0010190 A1 | 1/2008 | Rackley, III et al. | |
| 2008/0010191 A1 | 1/2008 | Rackley, III et al. | |
| 2008/0010193 A1 | 1/2008 | Rackley, III et al. | |
| 2008/0010204 A1 | 1/2008 | Rackley, III et al. | |
| 2008/0011825 A1 | 1/2008 | Giordano et al. | |
| 2008/0016232 A1 | 1/2008 | Yared | |
| 2008/0027844 A1 | 1/2008 | Little et al. | |
| 2008/0040265 A1 | 2/2008 | Rackley, III et al. | |
| 2008/0078831 A1 | 4/2008 | Johnson et al. | |
| 2008/0091528 A1* | 4/2008 | Rampell | G06Q 30/0207 705/14.1 |
| 2008/0103923 A1* | 5/2008 | Rieck et al. | 705/26 |
| 2008/0108324 A1 | 5/2008 | Moshir | |
| 2008/0126145 A1 | 5/2008 | Rackley | |
| 2008/0162346 A1 | 7/2008 | Aaron | |
| 2008/0166998 A1 | 7/2008 | Sun et al. | |
| 2008/0207203 A1 | 8/2008 | Arthur et al. | |
| 2008/0208743 A1 | 8/2008 | Arthur | |
| 2009/0037326 A1 | 2/2009 | Chilli et al. | |
| 2009/0098854 A1 | 4/2009 | Park | |
| 2009/0099961 A1 | 4/2009 | Ogilvy | |
| 2009/0119190 A1* | 5/2009 | Realini | G06Q 20/04 705/30 |
| 2009/0210308 A1 | 8/2009 | Toomer et al. | |
| 2010/0223160 A1* | 9/2010 | Brown | G06Q 20/102 705/26.1 |
| 2010/0257102 A1* | 10/2010 | Perlman | G06Q 20/04 705/75 |
| 2014/0108253 A1* | 4/2014 | Hartmaier | G06Q 20/04 705/44 |

OTHER PUBLICATIONS

Gridlock Manual, "Gridlock v.1.32", published 10/13/08, 6 pgs., found at http://www.pdabusiness.com/gridlock/manual/manual.html.
U.S. Appl. No. 12/544,944, filed Aug. 20, 2009, Casey et al.
U.S. Appl. No. 12/544,950, filed Aug. 20, 2009, Casey et al.
U.S. Appl. No. 12/351,687, filed Jan. 9, 2009, Casey et al.
U.S. Appl. No. 12/351,649, filed Jan. 9, 2009, Casey et al.
U.S. Appl. No. 12/351,714, filed Jan. 9, 2009, Casey et al.
U.S. Appl. No. 12/351,724, filed Jan. 9, 2009, Casey et al.
U.S. Appl. No. 12/351,674, filed Jan. 9, 2009, Casey et al.

* cited by examiner

ELECTRONIC DEVICE ENABLED PAYMENTS

BACKGROUND

The present disclosure relates generally to electronic devices, and, more particularly, to various techniques for conducting payment transactions with electronic devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Handheld electronic devices, such as mobile phones and personal data assistants, are becoming increasingly prevalent in today's society. The electronic devices may be used to perform many functions, such as storing contact information, accessing email, accessing the Internet, and placing phone calls. Further, certain devices may store financial information, such as credit card accounts, in an electronic wallet. As we move to a more mobile and fast-paced society, the use of cash or currency is being increasingly replaced by electronic transactions using credit cards, debit cards, etc. Individuals may carry only small amounts of cash, relying instead on electronic transactions for the majority of their purchases. While merchants may readily accept payments through electronic transactions, it may be cumbersome for individuals to accept electronic payments. However, individuals may need to frequently exchange money with other individuals or peers, but may be limited by the small amounts of cash that individuals typically carry.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to techniques for performing payment transactions with an initiator electronic device and a recipient electronic device. In accordance with one disclosed embodiment, a payer may initiate a payment transaction with the initiator device. Specifically, the payer may enter payment information, such as the payment amount, the payment account, and the payment recipient, through a graphical user interface (GUI) of the electronic device. The initiator device may then transmit the payment information to a transaction processing system. The transaction processing system may maintain payment accounts for the payer and the recipient and may use the contact information to determine the identity of the recipient. The transaction processing system may then send a payment notification to the recipient electronic device associated with the payment recipient.

In response to receiving the payment notification, the recipient may select a deposit account through the GUI of the recipient electronic device. The recipient device may then transmit the deposit account to the transaction processing system. However, before processing the payment, the transaction processing system may verify the identity of the recipient with the payer. For example, the transaction processing system may transmit the identity of the recipient to the payer in a payment confirmation notice. The payer may then confirm the payment by sending a confirmation through the initiator device to the transaction processing system. Upon receiving the confirmation, the transaction processing system may process the payment.

After a payment has been completed between an initiator device and a recipient device, certain steps of the payment process may be omitted to enable instant payments and/or instant deposits. For example, if the payer and the recipient have previously completed a payment, the transaction processing system may not confirm the identity of the recipient with the payer.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
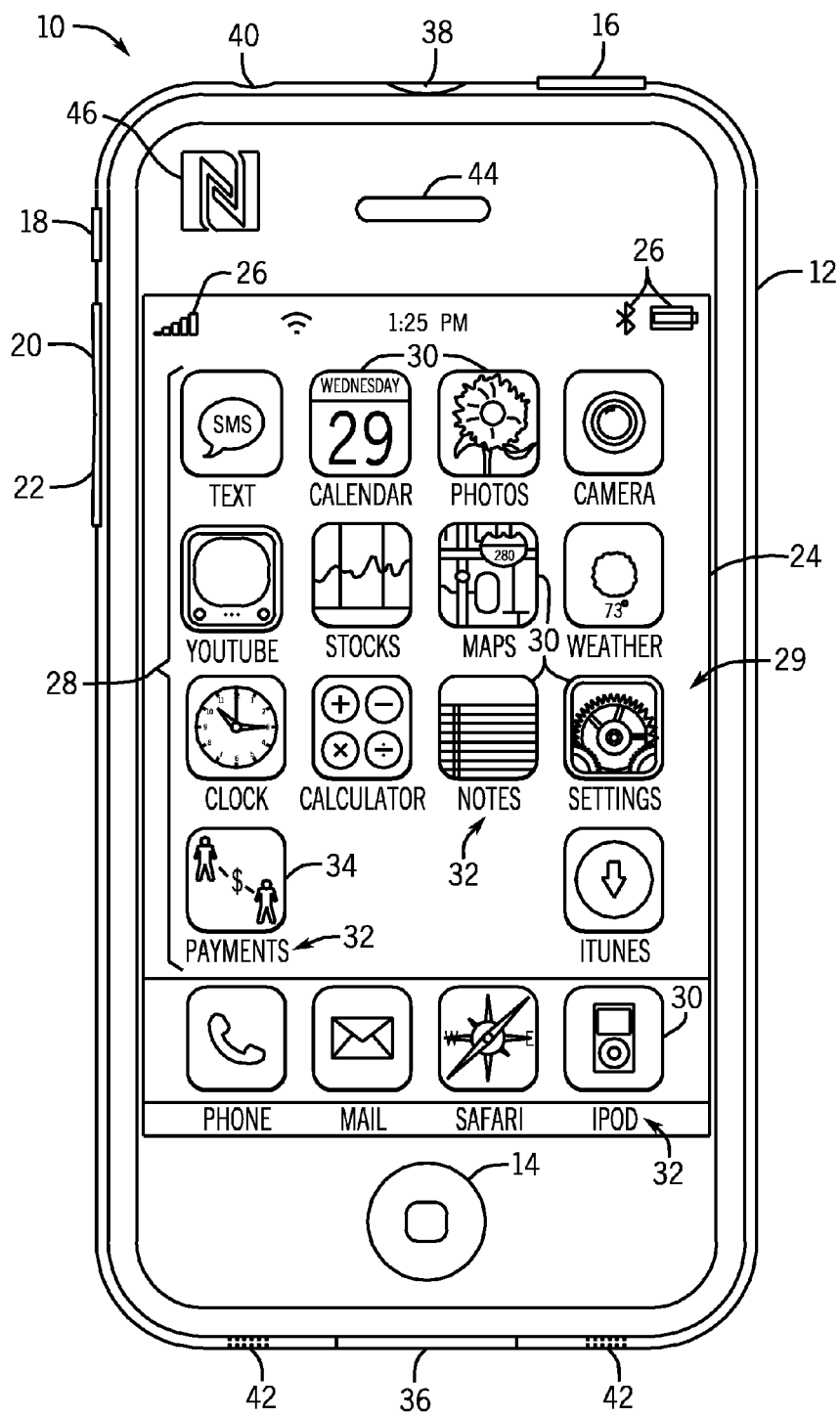
FIG. 1 is a front view of a portable electronic device in accordance with one embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to techniques for performing payment transactions with electronic devices. The techniques described herein may allow individuals to exchange money with their peers for everyday transactions, such as splitting a check at a restaurant or paying a friend for gas. Individuals desiring to perform peer-to-peer payments may establish payment accounts with a payment service provider. The individuals may enter financial account information into their payment accounts for withdrawing and receiving payments. The individuals may further link one or more electronic devices to their payment account. The service provider may provide secure storage for financial account information. In certain embodiments, the financial account information, such as the account number, bank routing number, and the like, may be stored by the payments provider, with unique identifiers associated with the financial accounts stored on the electronic devices. Accordingly, financial account information need not be stored on the electronic devices. Moreover, individuals also may exchange money with merchants that have established accounts with the service provider.

An individual may initiate a payment using one of the electronic devices linked to his payment account. For example, the payer may launch a payment application on the electronic device and select an account from which to make a payment. The payer also may enter contact information for the payment recipient. The initiator electronic device may then transmit the payment information to the service provider in the form of a payment request. Using the supplied contact information for the payment recipient, the service provider may determine the identity of the payment recipient and may transmit a payment notification to the recipient electronic device associated with the payment recipient's payment account. For example, the payment notification may display the payment amount and the identity of the payer.

Using the recipient electronic device, the payment recipient may select an account to receive the payment. The recipient electronic device may then transmit this information to the payment service provider. The service provider may then transmit the identity of the recipient to the initiator device to confirm the identity of the payment recipient with the payment initiator. Upon receiving payment confirmation from the payment initiator, the service provider may process the payments transaction. In certain embodiments, the service provider may charge a fee, which may be deducted from the payment, for processing the payment. Moreover, the fee may vary depending on the type of deposit account selected to receive the payment.

After a payment has been performed between a payer and a payment recipient, the individuals may enable an instant payment option. If instant payment is enabled, the service provider may process the payment transaction without confirming the identity of the payment recipient with the payment initiator. Moreover, in certain embodiments, the individuals may enable an instant deposit option allowing the payment provider to deposit payments into a previously designated account, thereby eliminating confirmation and account selection by the payment recipient.

FIG. 1 illustrates an electronic device 10 that may make use of the techniques for conducting payments described above. It should be noted that while the techniques will be described below in reference to the illustrated electronic device 10 (which may be a cellular telephone, a media player for playing music and/or video, a personal data organizer, or any combination thereof), the techniques described herein are usable with any electronic device. For example, in certain embodiments, the payments may be initiated and/or received through a desktop computer.

As illustrated in FIG. 1, the electronic device 10 may be a handheld device incorporating the functionality of one or more portable devices, such as a media player, a cellular phone, a personal data organizer, and so forth. Depending, of course, on the functionalities provided by the electronic device 10, a user may listen to music, play games, record video, take pictures, and place telephone calls, while moving freely with the device 10. In addition, the electronic device 10 may allow a user to connect to and communicate through the Internet or through other networks, such as local or wide area networks. For example, the electronic device 10 may allow a user to communicate using e-mail, text messaging, instant messaging, or other forms of electronic communication. The electronic device 10 also may communicate with other devices using short-range connections, such as Bluetooth and near field communication (NFC). By way of example, the electronic device 10 may be a model of an iPhone®, available from Apple Inc. of Cupertino, Calif.

In the depicted embodiment, the device 10 includes an enclosure 12 that protects the interior components from physical damage and shields them from electromagnetic interference. The enclosure 12 may be formed from any suitable material such as plastic, metal or a composite material and may allow certain frequencies of electromagnetic radiation to pass through to wireless communication circuitry within the device 10 to facilitate wireless communication.

The enclosure 12 allows access to user input structures 14, 16, 18, 20, and 22 through which a user may interface with the device. Each user input structure 14, 16, 18, 20, and 22 may be configured to control a device function when actuated. For example, the input structure 14 may include a button that when pressed causes a "home" screen or menu to be displayed on the device. The input structure 16 may include a button for toggling the device 10 between a sleep mode and a wake mode. The input structure 18 may include a two-position slider that silences a ringer for the cell phone application. The input structures 20 and 22 may include buttons for increasing and decreasing the volume output of the device 10. In general, the electronic device 10 may include any number of user input structures existing in various forms including buttons, switches, control pads, keys, knobs, scroll wheels, or other suitable forms.

The device 10 also includes a display 24 that may display various images generated by the device. For example, the display 24 may show movies, and/or data, such as text documents, work schedules, financial spreadsheets, text messages, and e-mail, among other things. The display 24 also may display system indicators 26 that provide feedback to a user, such as power status, signal strength, call status, external device connection, and the like. The display 24 may be any type of display such as a liquid crystal display (LCD), a light emitting diode (LED) display, an organic light emitting diode (OLED) display, or other suitable display.

Additionally, the display 24 may include a touch-sensitive element, such as a touch screen.

The display 24 may be used to display a graphical user interface (GUI) 28 that allows a user to interact with the device. The GUI 28 may include various layers, windows, screens, templates, elements, or other components that may be displayed in all, or a portion, of the display 24. Generally, the GUI 28 may include graphical elements that represent applications and functions of the device 10. The graphical elements may include icons and other images representing buttons, sliders, menu bars, and the like. In certain embodiments, the user input structure 14 may be used to display a home screen 29 of the GUI 28. For example, in response to actuation of the input structure 14, the device may display graphical elements, shown here as icons 30, of the GUI 28. The icons 30 may correspond to various applications of the device 10 that may open upon selection of an icon 30. The icons 30 may be selected via a touch screen included in the display 24, or may be selected by user input structures, such as a wheel or button.

The icons 30 may represent various layers, windows, screens, templates, elements, or other components that may be displayed in some or all of the areas of the display 24 upon selection by the user. Furthermore, selection of an icon 30 may lead to a hierarchical navigation process, such that selection of an icon 30 leads to a screen that includes one or more additional icons or other GUI elements. Textual indicators 32 may be displayed on or near the icons 30 to facilitate user interpretation of each icon 30. It should be appreciated that the GUI 30 may include various components arranged in hierarchical and/or non-hierarchical structures.

When an icon 30 is selected, the device 10 may be configured to open an application associated with that icon and display a corresponding screen. For example, when the Payments icon 34 is selected, the device 10 may be configured to open an application for initiating a payment. The application also may be used to customize preferences associated with payment transactions. For each application, screens including additional icons or other GUI elements may be displayed on the display 24.

The electronic device 10 also may include various input and output (I/O) ports 36, 38, and 40 that allow connection of the device 10 to external devices. The I/O port 36 may be a connection port for transmitting and receiving data files, such as media files or customer order files. For example, the I/O port 36 may be a proprietary port from Apple Inc. The I/O port 38 may be a connection slot for receiving a subscriber identify module (SIM) card. The I/O port 40 may be a headphone jack for connecting audio headphones. In other embodiments, the device 10 may include any number of I/O ports configured to connect to a variety of external devices, including but not limited to a power source, a printer, a computer, and an intermediate device, such as a dock, for communicating with an external server. In certain embodiments, multiple ports may be included on the device. The ports may be any interface type, such as a universal serial bus (USB) port, serial connection port, IEEE-1394 port, or AC/DC power connection port.

Further, in some embodiments, certain I/O ports may be configured to provide for more than one function. For instance, in one embodiment, the I/O port 36 may be configured to not only transmit and receive data files, as described above, but may be further configured to couple the device to a power charging interface, such as a power adaptor designed to provide power from a electrical wall outlet, or an interface cable configured to draw power from another electrical device, such as a desktop computer. Thus, the I/O port 36 may be configured to function dually as both a data transfer port and an AC/DC power connection port depending, for example, on the external component being coupled to the device 10 through the I/O port 36.

The electronic device 10 may also include various audio input and output structures 42 and 44. For example, the audio input structures 42 may include one or more microphones for receiving voice data from a user. The audio output structures 44 may include one or more speakers for outputting audio data, such as data received by the device 10 over a cellular network. Together, the audio input and output structures 42 and 44 may operate to provide telephone functionality. Further, in some embodiments, the audio input structures 42 may include one or more integrated speakers serving as audio output structures for audio data stored on the device 10. For example, the integrated speakers may be used to play music stored in the device 10.

The device 10 may further include a near field communication (NFC) device 46. The NFC device 46 may be located within the enclosure 12, and a mark or symbol on the exterior of the enclosure 12 may identify its location within the enclosure 12. The NFC device 46 may allow for close range communication at relatively low data rates (424 kb/s), and may comply with standards such as ISO 18092 or ISO 21481, or it may allow for close range communication at relatively high data rates (560 Mbps), and may comply with the TransferJet® protocol. In certain embodiments, the communication may occur within a range of approximately 2 to 4 cm. The close range communication with the NFC device 46 may take place via magnetic field induction, allowing the NFC device 46 to communicate with other NFC devices or to retrieve information from tags having radio frequency identification (RFID) circuitry. As discussed below, the NFC device 46 may provide a manner of acquiring contact information for a payment transaction.

Figure 2:
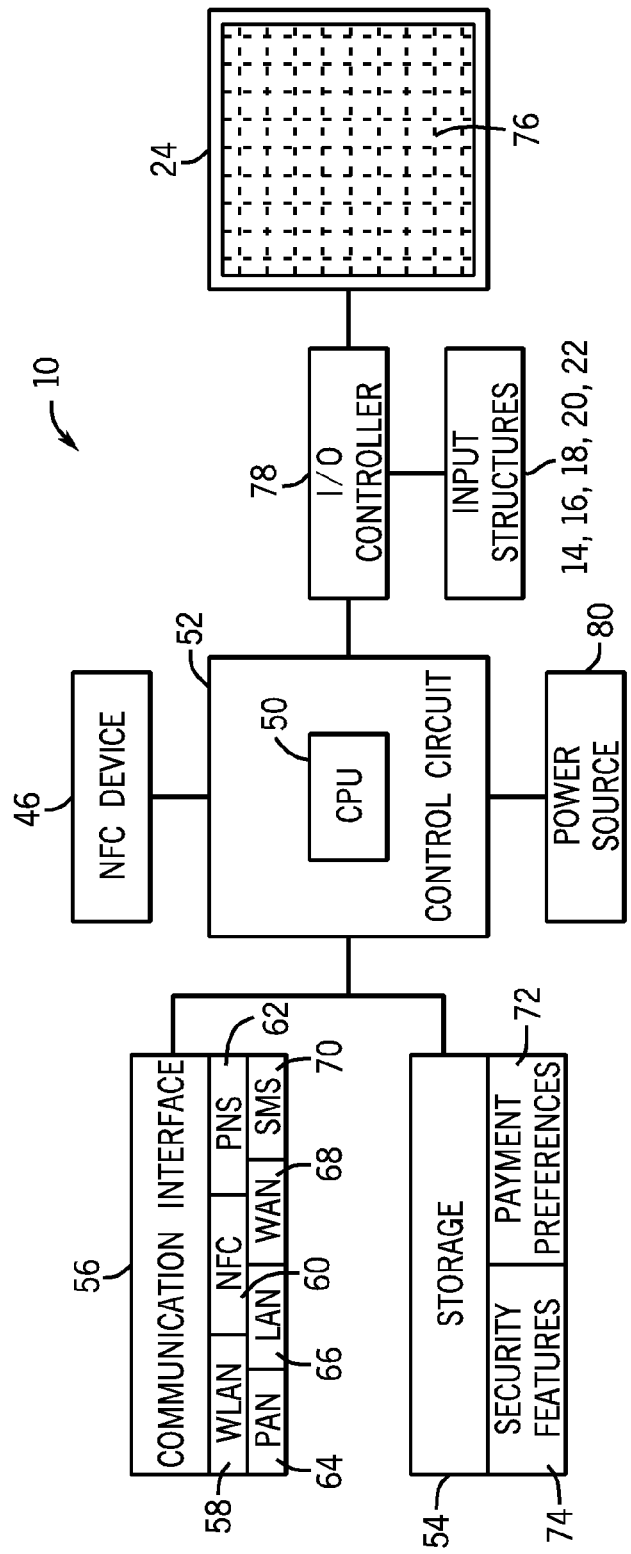
FIG. 2 is a simplified block diagram of the device of FIG. 1 in accordance with one embodiment.

Additional details of the illustrative device 10 may be better understood through reference to FIG. 2, which is a block diagram illustrating various components and features of the device 10 in accordance with one embodiment of the present disclosure. The block diagram includes the display 24, the NFC device 44, and the input structures 14, 16, 18, 20, and 22 discussed above, as well as many other components.

The operation of the device 10 may be controlled by a central processing unit (CPU) 50 and a control circuit 52 that provide the processing capability required to execute the operating system, programs, GUI 28, and any other functions of the device 10. The CPU 50 may include a single processor or it may include a plurality of processors. For example, the CPU 50 may include "general purpose" microprocessors, a combination of general and special purpose microprocessors, instruction set processors, graphics processors, video processors, and/or related chips sets, and/or special purpose microprocessors. The control circuit 52 may include one or more data buses for transferring data and instructions between components of the device 10. The control circuit 52 also may include on board memory for caching purposes. Additionally, although not illustrated in FIG. 2, the device 10 may include a standalone random access memory (RAM) in communication with the CPU 50 by way of one or more memory controllers, which may be integrated within the control circuit 52.

Information used by the CPU 50 may be located within a storage 54. The storage 54 may be non-volatile memory such as read only memory, flash memory, a hard drive, or any other suitable optical, magnetic, or solid-state computer readable media, as well as a combination thereof. Thus, although the long term storage 54 is depicted as a single device for purposes of clarity, it should understood that the long term storage 54 may include one or more of a combination of the above-listed storage devices operating in conjunction with the CPU 50.

The storage 54 may be used for storing data required for the operation of the CPU 50 as well as other data required by the device 10. For example, the storage 54 may store the firmware for the electronic device 10 that is used by the CPU 50. The firmware may include an operating system, as well as other programs that enable various functions of the electronic device 10, GUI functions, and/or processor functions. The storage 54 also may store components for the GUI 28, such as graphical elements, screens, and templates. Additionally, the long term storage 54 may store data files such as media (e.g., music and video files), image data, software, preference information (e.g., media playback preferences), wireless connection information (e.g., information that may enable the device 10 to establish a wireless connection, such as a wireless network or telephone connection), subscription information (e.g., information that maintains a record of podcasts, television shows or other media to which a user subscribes), telephone information (e.g., telephone numbers), and any other suitable data.

One or more communication interfaces 56 may provide additional connectivity channels for receiving and transmitting information. The communication interface 56 may represent, for example, one or more network interface cards (NIC) or a network controller as well as associated communication protocols. The communication interface 56 may include several types of interfaces, including but not limited to, a wireless local area network (WLAN) interface 58, an NFC interface 60, a push notification service (PNS) interface 62, a personal area network (PAN) interface 64, a local area network (LAN) interface 66, a wide area network (WAN) interface 68, and a short message service (SMS) interface 70.

The PAN interface 64 may provide capabilities to network with, for example, a Bluetooth® network, an IEEE 802.15.4 (e.g., ZigBee) network, or an ultra wideband network (UWB). As should be appreciated, the networks accessed by the PAN interface 64 may, but do not necessarily, represent low power, low bandwidth, or close range wireless connections. The PAN interface 64 may permit one electronic device 10 to connect to another local electronic device, such as a computer or portable media player, via an ad-hoc or peer-to-peer connection. However, the connection may be disrupted if the separation between the two electronic devices exceeds the range of the PAN interface 64.

The LAN interface 66 and WLAN interface 58 may provide longer-range communication channels, generally exceeding the range available via the PAN interface 64. The LAN interface 66 may represent an interface to a wired Ethernet-based network, and the WLAN interface 58 may represent an interface to a wireless LAN, such as an IEEE 802.11x wireless network. Additionally, in many cases, a connection between two electronic devices via the LAN interface 66 may involve communication through a network router or other intermediary device.

Connection to a wide area network (WAN) may be provided through the WAN interface 68. In certain embodiments, the wide area network may include a private network maintained by a merchant for transferring information between retail stores. The WAN interface 68 may permit a connection to a cellular data network, such as an Enhanced Data rates for GSM Evolution (EDGE) network or a 3G data network (e.g., based on the IMT-2000 standard). When connected via the WAN interface 68, the electronic device 10 may remain connected to the Internet and, in some embodiments, to another electronic device, despite changes in location that might otherwise disrupt connectivity via the PAN interface 64 or the LAN interface 66.

In certain embodiments, the device 10 may use a device identification networking protocol to establish a connection with an external device through a network interface. For example, both the device 10 and the external device may broadcast identification information using internet protocol (IP). The devices may then use the identification information to establish a network connection, such as a PAN connection or a LAN connection, between the devices. By way of example, the device identification protocol may be Bonjour® by Apple Inc.

Small size communications may be sent using the PNS interface 62 and the SMS interface 70. The SMS interface 70 may allow transmission of text messages of 140 bytes or less. In certain embodiments, larger size messages may be sent using concatenated SMS. The PNS interface 62 may facilitate the transmission and/or receipt of push notifications. For example, an external server may push notifications to the device 10 through a constantly open IP connection, established using, for example, a Wi-Fi or Edge network. According to certain embodiments, the PNS interface 62 may be designed to interface with the Apple Push Notification Service, created by Apple, Inc. Moreover, in certain embodiments, the PNS interface 62 may be used to transmit information to and/or to receive information from a payment service provider.

Close range communication may occur through the NFC interface 60. The near field communication (NFC) interface 60 may operate in conjunction with the NFC device 44 to allow for close range communication. The NFC interface 60 may exist as a separate component, may be integrated into another chipset, or may be integrated with the NFC device 44, for example, as part of a system on a chip (SoC). The NFC interface 60 may include one or more protocols, such as the Near Field Communication Interface and Protocols (NFCIP-1) for communicating with another NFC enabled device. The protocols may be used to adapt the communication speed and to designate one of the connected devices as the initiator device that controls the near field communication. In certain embodiments, the NFC interface 60 may be used to receive information, such as the service set identifier (SSID), channel, and encryption key, used to connect through another communication interface 58, 64, 66, or 68. Moreover, in certain embodiments, the NFC interface 60 may be used to receive recipient identification information from a recipient's electronic device.

The NFC device 46 may control the near field communication mode of the electronic device 10. For example, the NFC device 46 may be configured to switch the NFC device 46 between a reader/writer mode for reading NFC tags, a peer-to-peer mode for exchanging data with another NFC enabled device, and a card emulation mode for allowing another NFC enabled device to read information. The NFC device 46 also may be configured to switch between an active mode where the NFC device 46 generates its own RF field and a passive mode where the NFC device 46 uses load modulation to transfer data to another device generating a RF field. Operation in passive mode may prolong the battery life of the device 10. In certain embodiments, the modes of the NFC device 46 may be controlled based on user or manufacturer preferences 72.

The preferences 72 may be stored within the storage 54 and may be set by the device manufacturer or by a user through the GUI 28 (FIG. 1). The preferences 72 may determine properties of a communication interface 44, 56, 58, 62, 64, 66, 68, and 70. For example, the preferences 72 may include a list of networks to which the device 10 may connect. In another example, the preferences 72 may specify the mode of the NFC device 44.

The preferences 72 also may govern operation of payment transactions initiated using the payment application. For example, the preferences 72 may be set by a user to enable instant payments or instant deposits. In another example, the preferences 72 may be used to set maximum payment amounts for payments initiated using the electronic device 10. Moreover, in certain embodiments, the preferences 72 may be used to set a geographic area where the device may be located to make payments.

Along with the preferences 72, security features 74 may be stored within the storage 54. The security features 74 may include one or more cryptographic protocols, such as a secure sockets layer (SSL) protocol or a transport layer security (TLS) protocol, for establishing secure communications between the device 10 and the payment service provider. The security features 74 also may include a secure storage area that may have restricted access. For example, a personal identification number (PIN) or other verification may need to be provided to access the secure storage area. In certain embodiments, some or all of the preferences 72 may be stored within the secure storage area. In certain embodiments, the secure storage area may include a microcontroller embedded within the electronic device 10.

The security features 74 may also include a secure access-restricted storage area (e.g., within the storage device 54) to limit access to the data that may be required by the certain aspects of the security features 74, such as encryption keys, passcodes and passwords, digital certificates, or the like. Additionally, the secure storage area may be adapted to store sensitive data, such as information pertaining to a user's payment accounts. The payment accounts may include financial accounts, such as credit card accounts and banking accounts.

The payment accounts also may include accounts of a non-financial nature. As used herein, the term "non-cash account," "non-financial account," or the like shall be understood to refer to accounts which may contain non-monetary assets that may nevertheless be used as a medium of exchange with at least one party, such as the institution holding or maintaining the non-cash account. To provide one example, a non-financial or non-cash account may be a user's online music/media subscription or purchase account, such as an iTunes® account available through the iTunes® online digital media store, developed and operated by Apple Inc. An iTunes® account may include a number of "credits" by which a user may redeem or exchange at the iTunes® online media store for media files, such as music files, movie files, audiobooks, podcasts, or the like. Thus, these non-cash accounts may be stored alongside financial accounts (e.g., banking and credit card accounts) within the secure storage area provided by the security features 74.

However, in other embodiments, unique identifiers associated with payment accounts may be stored within the storage 54, while the account information (i.e. account numbers, pins, etc.) is maintained and stored by the payment service provider. The storage of account information by the payment service provider may enhance security by inhibiting access to account information if a user's electronic device 10 is lost or stolen.

The security features 74 may further allow a user to lock or temporarily disable all (e.g., lock on power-up) or only certain functions on the device 10, such as the functionalities which may be provided with the payment application described above with respect to icon 34 (FIG. 1). By way of example, when locked, the payment initiation features and/or payment acceptance features may be disabled or inaccessible by users until the user is authenticated, such as by entry of a user-specified PIN, password, or other suitable authenticator. In another example, access to the payment preferences 72 may be restricted using the security features 74. The security features 74 described herein may be particularly useful in preventing the device 10 from being used to initiate payments by unauthorized persons.

Information for initiating and/or accepting payments may be displayed on the display 24. As noted above, a user may select information to display through the GUI 28 (FIG. 1). A touch screen 76 may be positioned in front of or behind the display 24 and may be used to select graphical elements, such as the icons 30 (FIG. 1), shown on the display 24. The touch screen 76 is configured to receive input from a user's or object's touch and to send the information to the CPU 50, which interprets the touch event and performs a corresponding action. The touch screen 76 may employ any suitable type of touch screen technology such as resistive, capacitive, infrared, surface acoustic wave, electromagnetic, or near field imaging. Furthermore, the touch screen 76 may employ single point or multipoint sensing.

An input/output (I/O) controller 78 may provide the infrastructure for exchanging data between the control circuit 52 and the input/output devices, such as the input structures 14, 16, 18, 20, and 22, the touch screen 76, and the display 24. The user input structures 14, 16, 18, 20, and 22 may be used in conjunction with, or independently of, the touch screen 76 to select inputs for the device 10. The I/O controller 78 may contain one or more integrated circuits and may be integrated within the control circuit 52 or exist as a separate component. The I/O controller 78 also may provide the infrastructure for communicating with external devices through the I/O ports 36 and 38 shown in FIG. 1 and may be used for connecting the device 10 to an external computer, a printer, audio headphones, or the like.

The portability of the device 10 may make it particularly well suited to initiating and receiving payment transactions in a wide variety of environments. To facilitate transport and ease of motion, the device 10 may include an integrated power source 80 for powering the device 10. The power source 80 may include one or more batteries, such as a Li-Ion battery, which may be user-removable or secured to the enclosure 12. In certain embodiments, a proprietary connection I/O port may be used to connect the device 10 to a power source for recharging the battery.

Figure 3:
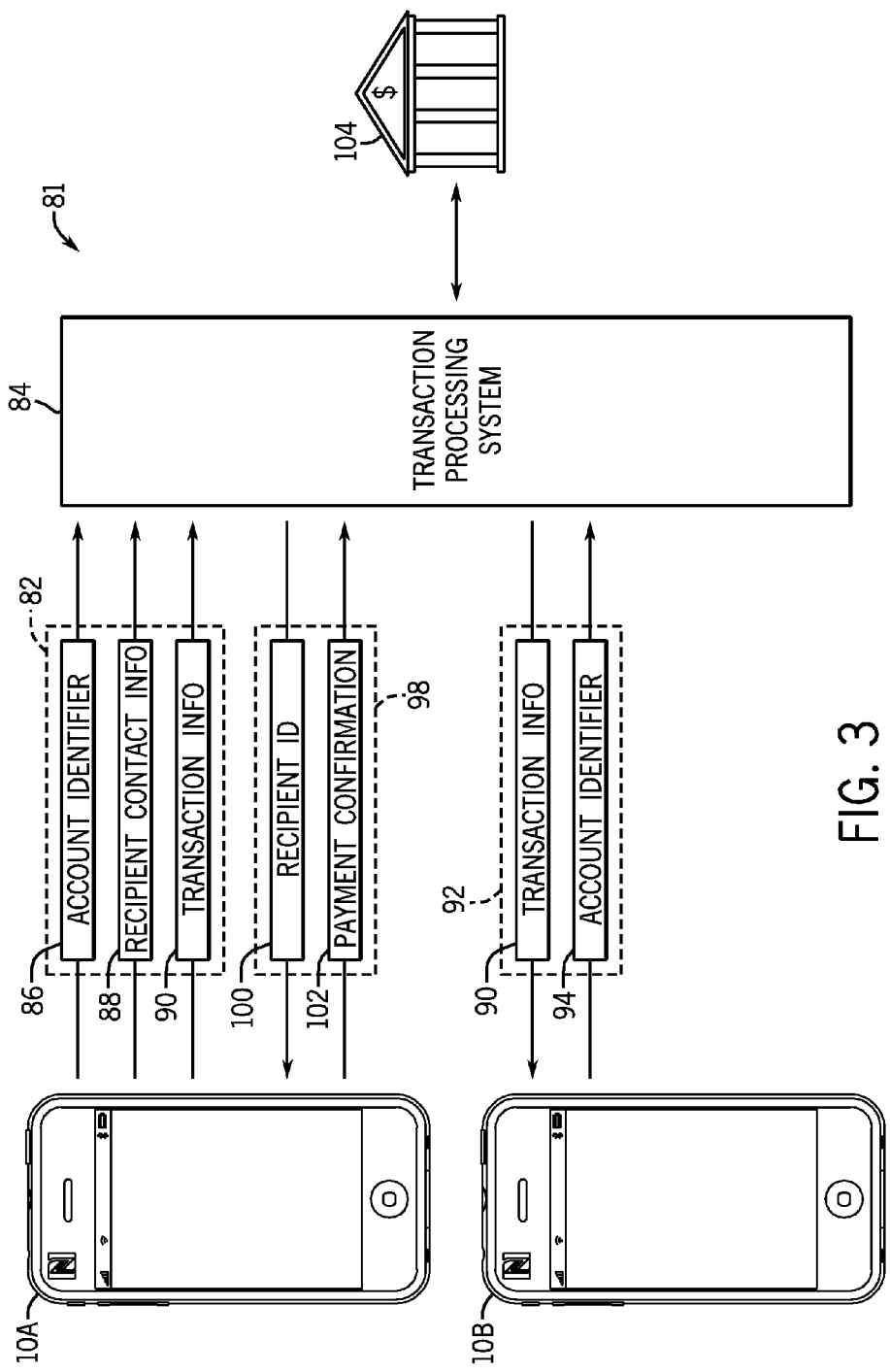
FIG. 3 is a diagrammatical representation of a system for conducting payment transactions in accordance with one embodiment.

FIG. 3 illustrates a system 81 for conducting a payment transaction using an initiator electronic device 10A and a recipient electronic device 10B. Although the electronic devices 10A and 10B are generally shown as an electronic device 10, in other embodiments, the electronic devices 10A and 10B may represent other types of portable electronic devices, such as portable media players, laptop computers, cellular telephones, and personal data assistants, as well as other types of electronic devices, such as desktop computers and digital video recorders. However, in certain embodiments, the portability of the handheld electronic devices 10A and 10B may allow the payments to be initiated and/or received within a wide variety of environments. For example, payments may be initiated and/or received while dining at a restaurant or while shopping.

The payment transaction may be initiated by an initiator device 10A. For example, the payer may open a payment application stored on the initiator device 10A and may enter information for the payment through the payment application. Collectively, the information may represent a payment initiation request 82 that may be transmitted to a transaction processing system 84. The transaction processing system 84 may be maintained by a payment service provider. For example, the transaction processing system 84 may be an external server managed by a third party provider to process payments. In certain embodiments, the transaction processing system 84 may be maintained by the manufacturer of the electronic device 10, by a mobile phone service provider, by a bank or financial institution from which funds are managed or being withdrawn, or by a third party.

The transaction processing system 84 may maintain payment accounts for the payer and the payment recipient and may use information stored within the accounts to process the payment. For example, within the payment accounts, the transaction processing system 84 may store payment account information for the payer and for the payment recipient. The accounts also may store information identifying the electronic devices 10A and 10B associated with the payer and the recipient. In certain embodiments, the payer and payment recipient may establish accounts on the transaction processing system 84 using a software application, such as iTunes®.

The electronic devices 10A and 10B may communicate with the transaction processing system 84 using the communication interfaces 56 of the electronic devices 10A and 10B. For example, in certain embodiments, the communications may occur using the PNS interfaces 62. However, in other embodiments the communication may occur using the SMS interface 70, the WAN interface 68, or the LAN interface 66 among others.

To initiate a payment, the initiator device 10A may transmit the payment initiation request 82 to the transaction processing system 84. The payment initiation request 82 may include account identification information 86. For example, the account identification information 86 may include a unique identifier stored on the initiator device 10A that the transaction processing system 84 may use to identify a payment account from which to make the payment. For example, the unique identifier may be linked to a credit card account or bank account stored by the transaction processing system 84. The payment initiation request 82 also may include contact information 88 that may be used by the transaction processing system 84 to establish the identity of the payment recipient. For example, the contact information 88 may include a mobile phone number, email address, or the like for the payment recipient. In another example, the contact information 88 may include a code or unique identifier included on a sales slip, such as a restaurant bill.

The payment initiation request 82 further may include transaction information 90 that describes the parameters of the payment. For example, the transaction information may include the amount of the payment, as well as comments entered by the payer describing the transaction. Moreover, in certain embodiments, the transaction information 90 may include an indication of whether the payer has performed a payment to the recipient before, thereby allowing instant payment options to be enabled. Further, the transaction information 90 may include an identification indicating that the payer wishes to remain anonymous.

The transaction processing system 84 may use the contact information 88 and the transaction information 90 received in the payment initiation request 82 to transmit a payment notification 92 to the recipient device 10B. Specifically, the transaction processing system 84 may use the contact information 88 to identify the recipient device 10B to which to send the payment notification 92. The payment notification 92 may include all, or a portion of, the transaction information 90. For example, the payment notification 92 may transmit to the recipient device 10B the amount of the payment and the name of the payer (if the payment is not being made anonymously) included within the transaction information 90.

The recipient device 10B may then display the transaction information 90 to allow the payment recipient to decide whether to accept the payment. If the payment recipient wishes to accept the payment, the recipient may select a deposit account for receiving the payment. An account identifier 94 corresponding to the selected deposit account may be transmitted back to the transaction processing system 84. In certain embodiments, the account identifier 94 also may represent acceptance of the payment. However, in other embodiments, a separate acceptance notification may be sent with the account identifier 94. In certain embodiments, the acceptance also may indicate permission for the transaction processing system 84 to send the identity of the payment recipient to the initiator device 10A. Using the received identity, the payer may verify the identity of the payment recipient before authorizing the payment.

The transaction processing system 84 may then transmit a payment confirmation 98 to the initiator device 10A to confirm the payment before processing the payment. Specifically, the transaction processing system 84 may determine a recipient identifier 100 and transmit the recipient identifier 100 to the initiator device 10A. For example, the transaction processing system 84 may use the contact information 88 provided by the payer to perform an independent verification of the recipient's identity. For example, the transaction processing system 84 may determine the identity of the recipient that corresponds to the account associated with the contact information 88 and stored within the transaction processing system 84. In one embodiment, data determined using the contact information 88 may be compared to data determined using the account identifier 94 to corroborate that an entity associated with the contact information 88 is the same as an entity associated with the account identified by the account identifier 94. In other embodiments, the transaction processing system 84 may determine the identity of the recipient based on a serial number of the recipient device 10B or other suitable identifiers.

After receiving the recipient identifier 100, the initiator device 10A may display the identity of the recipient and may prompt the payer to confirm the payment. Upon confirmation, the initiator device 10A may transmit a payment confirmation 102 to the transaction processing system 84. The transaction processing system 84 may then process the payment immediately or after a delay during which the payer may send a cancellation or modification of the payment request. For example, the transaction processing system 84 may communicate with one or more financial institutions 104 to process the payment. Specifically, the transaction processing system 84 may withdraw the payment from the payer's account and deposit the payment into the recipient's account. In certain embodiments, the transaction processing system 84 may communicate with the financial institutions 104 using the automated clearing house (ACH) network.

Figure 4:
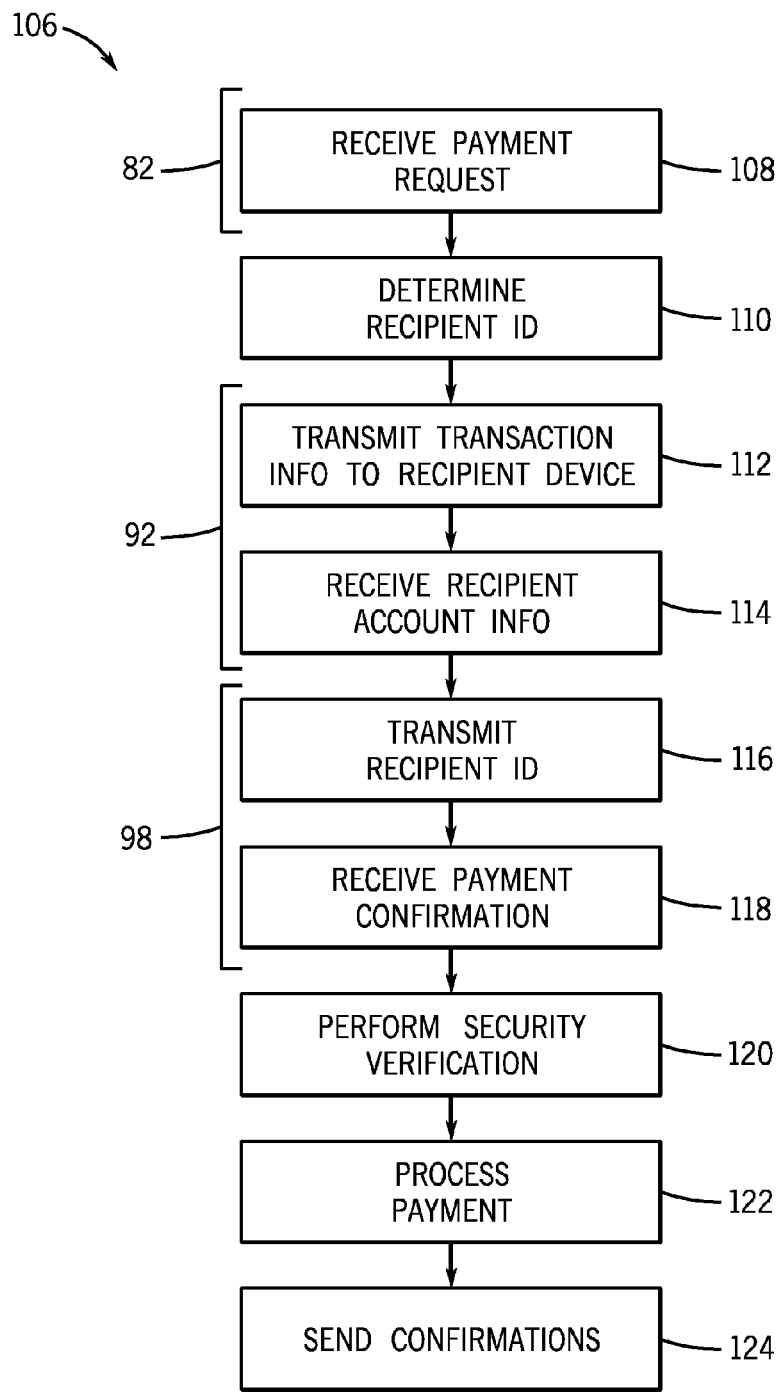
FIG. 4 is a flowchart depicting a method for conducting a payment transaction accordance with one embodiment.

FIG. 4 is a flowchart depicting an embodiment of a method 106 that may be employed by the transaction processing system 84 (FIG. 3) to process a payment. The method may begin by receiving (block 108) a payment initiation request 82. For example, the transaction processing system 84 shown in FIG. 3, may receive the payment initiation request 82 including the account identification information 86, the recipient information 88, and the transaction information 90. The transaction processing system 84 may then use the recipient information 88 to determine (block 110) a recipient identifier. For example, the transaction processing system 84 may determine the name of the person associated with the contact information 88 provided in payment initiation request 82. In certain embodiments, the processing system 84 may use the recipient identifier to ensure that the recipient has an account with the transaction processing system 84.

The transaction processing system 84 may then transmit (block 112) the transaction information 90 (FIG. 3) to the recipient device as part of the payment notification 92. In certain embodiments, the transaction processing system 84 may use the contact information 88 transmitted with the payment initiation request 82 to determine the recipient device 10B to which to send the payment notification 92. For example, the transaction processing system 84 may use an email address provided in the contact information 88 to identify a mobile phone number or electronic device serial number associated with a payment account corresponding to that email address.

The transaction processing system 84 may then wait to receive (block 114) deposit account information from the recipient device 10B. For example, the payment recipient may select a deposit account through the GUI 28 of the recipient device 10B. The recipient device 10B may then transmit an account identifier 94 to the transaction processing system 84 to identify the deposit account. In certain embodiments, the transmitted account identifier 94 also may indicate permission by the recipient to send her identity to the payment initiator. However, in other embodiments, a separate acceptance indication may be transmitted to the transaction processing system 84 along with the account information.

After receiving the account information, the transaction processing system 84 may transmit (block 116) the recipient identity 100 to the initiator device 10A as part of the payment confirmation 98. As noted above with respect to FIG. 3, the recipient identity 100 may include the name of the recipient obtained by the transaction processing system 84. For example, the transaction processing system 84 may use the provided recipient phone number or email address to look up the recipient's account and corresponding name on that account.

The initiator device 10A may then display the recipient identity, for example, on the display 24, and prompt the payment initiator to confirm the payment. The transaction processing system 84 may then receive (block 118) the payment confirmation from the initiator device 10A. The payment confirmation may indicate that the payment initiator has approved the identity of the recipient and is ready to complete the payment process.

In certain embodiments, the transaction processing system 84 may then perform (block 120) a security verification. For example, the security verification may include verifying that the payment account and the deposit account are associated with the payment initiator and recipient. In certain embodiments, the transaction processing system 84 also may obtain authorization from the financial institution associated with the account. For example, the transaction processing system 84 may contact a credit card provider to obtain authorization for a credit card payment.

In certain embodiments, if the financial institution is unable to immediately authorize the payment, the transaction processing system 84 may obtain authorization via the initiator device 10A. For example, the transaction processing system 84 may call the payment initiator through the initiator device 10A to verify identification information for the payment initiator. In another example, the transaction processing system 84 may perform another type of verification, such as determining the location of the device 10A, for example, using global positioning software included within the device 10A, or by determining the cellular network that the device is using. Moreover, the security verification may include verifying parameters set by the payment initiator and/or the payment recipient. For example, in setting up an account, the payment initiator may set limits on the maximum amount of a payment that may be made or may specify specific recipients that may receive payments. These parameters may be stored as payment preferences 72 on the devices 10A and 10B and/or may be stored within the accounts maintained by the transaction processing system 84.

After the security verification has been completed, the transaction processing system may process (block 122) the payment. For example, the transaction processing system 84 may contact the appropriate financial institutions associated with the payment account and the deposit account. In certain embodiments, after the payment has been processed, the transaction processing system may send (block 124) confirmations to the payment initiator device 10A and the recipient device 10B indicating that the payment has been completed successfully.

FIGS. 5-14 further illustrate methods of confirming a payment transaction using the electronic device 10. Many of these figures illustrate various screens that a user of the electronic device 10 may encounter while confirming a payment transaction. The screens may be part of the GUI 28 (FIG. 1) and may be navigated using the touch screen 54 (FIG. 2) and/or the user input structures 14, 16, 18, 20, and 22 (FIG. 1) of the electronic device 10. As may be appreciated, the functionality described may be achieved with a wide variety of graphical elements and visual schemes. Therefore, the screens shown in the following figures are not intended to be limiting. Other embodiments may include a wide variety of user interface styles and the precise user interface conventions shown herein are provided by way of example only.

Figure 5:
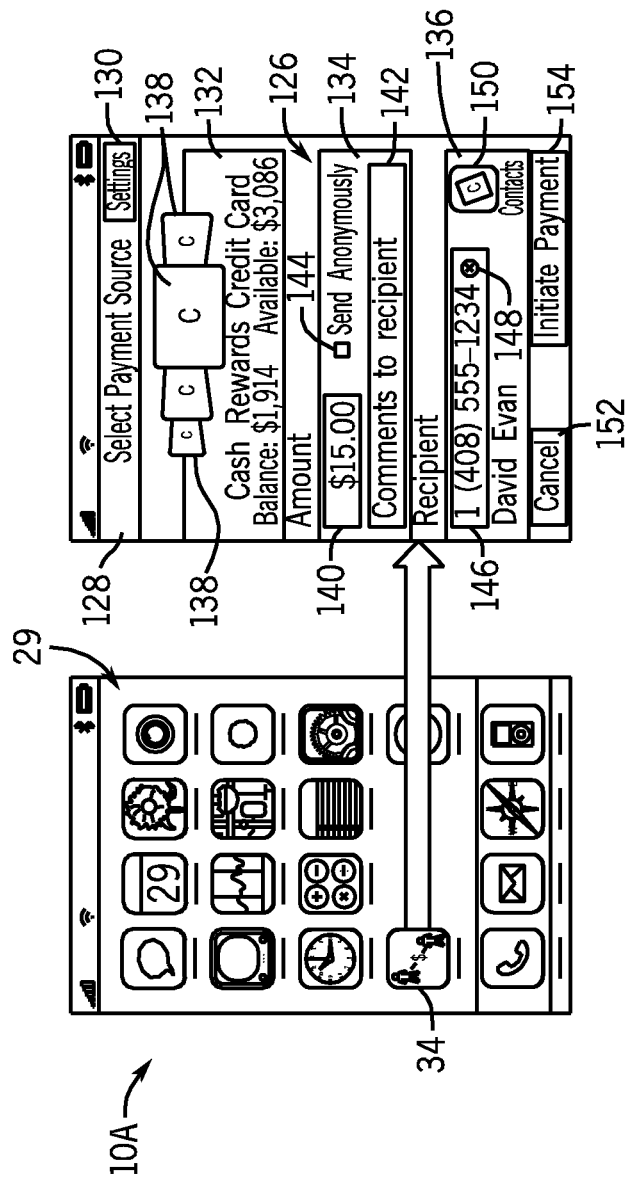
FIG. 5 is a view of screens of the device of FIG. 1 illustrating initiation of a payment transaction in accordance with one embodiment.

FIG. 5 illustrates a series of screens for initiating payments using the electronic device 10A. A payment application may be accessed through selection of the payment icon 34 shown on the home screen 29. Upon selection, the payment application may display a screen 126 that serves as the main screen of the payment application. The screen 126 includes a title bar 128 indicating the current state of the device 10A. As shown on the screen 126, the device 10A is currently waiting for a user to select a payment source.

From the main screen 126, a user may enter information for initiating a payment transaction. Specifically, the screen 126 includes graphical elements 130, 132, 134, and 136 that allow navigation within the payment application. For example, the graphical element 130 may correspond to a settings button that when selected may be used to access a setting screen of the payment application. The setting screen will be discussed further below with respect to FIG. 8.

The graphical elements 132, 134, and 136, shown here as display windows, allow a user to input information to initiate the payment transaction. Specifically, the display window 132 allows a user to select an account for making the payment. The display window 132 includes several images 138 corresponding to payment accounts. For example, the payment accounts may include credit cards, debit cards, bank accounts, checking accounts, and savings accounts, among others. Moreover, in certain embodiments, the payment accounts may include non-financial accounts, such as an iTunes® account. In certain embodiments, the display window 132 may display information about the selected payment source, such as the current balance and amount of available credit.

After an account image 138 has been selected, a user may enter the payment details through the display window 134. Specifically, a user may enter a payment amount through the input bar 140. For example, upon selection of the input bar 140, such as through the touch screen 76 (FIG. 2), a keypad may be displayed on the screen 126 for entering the amount. The display window 134 also includes an input bar 142 that may be used to enter comments to the recipient. For example, a user may enter comments through a keypad displayed on the touch screen 76 or through a physical keyboard connected to the electronic device 10. In certain embodiments, a user may enter comments describing the purpose of the payment. The display window 134 also includes a selection box 144 that may be used to specify that the user wished to make a payment anonymously. For example, a user may wish to anonymously donate money to a charity or to a friend in need.

After the transaction details have been entered through the display window 134, a user may enter the recipient contact information through the display window 136. Specifically, a user may select a selection bar 146 to enter a phone number or email address corresponding to the recipient. For example, selection of the selection bar 146 may cause the device 10A to display a keypad of the touch screen 76 (FIG. 2). The selection bar 146 also includes a graphical element 148 that may be selected to clear the information shown within the selection bar 146.

Instead of, or in addition to, entering the information though the selection bar 146, a user may select a graphical element 150 to access the user's electronic address book. Within the address book, the user may select a recipient, causing the selected recipient contact information to be displayed within the input bar 146. In certain embodiments, information corresponding to the contact information may be displayed below the input bar 146. For example, the name of the recipient included within the electronic address book may be shown below the input bar 146.

The screen 126 also includes graphical elements 152 and 154 that may be selected to cancel or initiate the payment, respectively. Specifically, the graphical element 152 may be selected to cancel the transaction and clear the data shown in the input bars 140, 142, 144, and 146. However, if the information has been entered correctly, the user may select the graphical element 154 to initiate the payment. In response to selection of graphical element 154, the device 10A may transmit the payment information, for example, as the payment initiation request 82, shown in FIG. 3, to the transaction processing system 84.

The transaction processing system 84 may then transmit a payment notification 92 (FIG. 3) to the recipient device 10B identified using the contact information 88 (FIG. 3). In certain embodiments, the payment notification 92 may prompt the payment recipient to accept the payment, for example, by selecting a deposit account to receive the payment. After the transaction processing system 84 has received the acceptance of the payment from the recipient, the transaction processing system 84 may request payment confirmation from the initiator device 10A in order to complete the payment.

Figure 6:
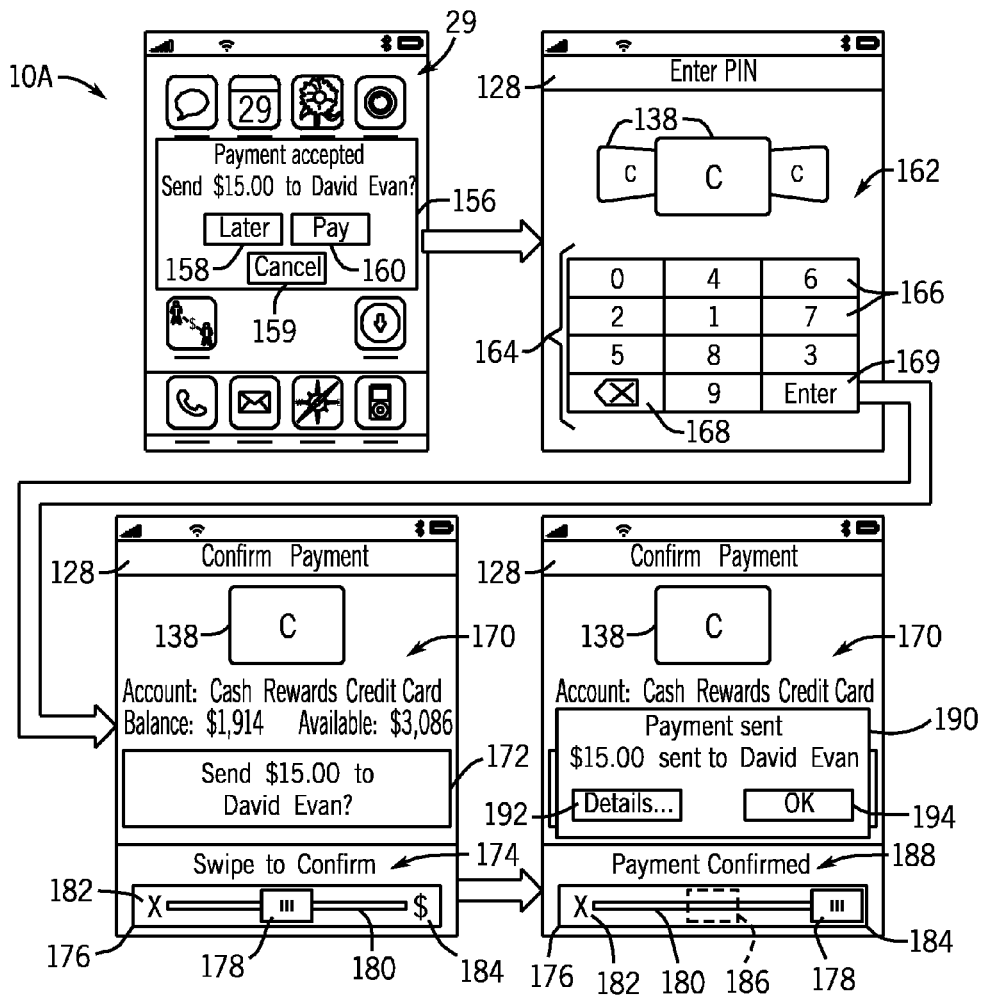
FIG. 6 is a view of screens of the device of FIG. 1 illustrating confirmation of a payment transaction in accordance with one embodiment.

FIG. 6 depicts a series of screens illustrating the payment confirmation process using the initiator device 10A. Specifically, a notification window 156 may be displayed on a home screen 29 of the initiator device 10A. Furthermore, in other embodiments, the notification window 156 may be displayed over the screen currently shown on the device 10A at the time the notification is received. For example, the notification window 156 may be displayed in front of a screen for another application, such as a calendar, email program, webpage, or the like. The notification window 156 may display a message indicating that the payment has been accepted and may further prompt the user to confirm the payment. Specifically, the notification window 156 includes graphical elements 158, 159, and 160 that the user may select to confirm or cancel the payment. Specifically, the graphical element 158 may be selected to confirm the payment at a later time, the graphical element 159 may be selected to cancel the payment, and the graphical element 160 may be selected to process the payment. In certain embodiments, selection of the graphical element 158 may enable a reminder within the electronic device 10A to produce the notification window 156 after a set period of time. In other embodiments, the user may access saved payments awaiting confirmation through the payment application.

If the user wishes to proceed with the payment at the present time, the user may select the graphical element 160 to complete the payment process. In response to selection to graphical element 160, the device 10A may display a PIN entry screen 162. The screen 162 may include an image 130 of the currently selected payment instrument and may also include a keypad 164 for entering a PIN corresponding to the payment instrument. Keys or buttons 166 of the keypad 164 may be used to enter a PIN or password for the selected payment instrument. The keypad 166 also may include a delete key 168 for removing an existing entry and an enter key 169 for entering the PIN.

After the PIN has been entered, a user may select the enter key 169 to submit the PIN and display a confirmation screen 170. In certain embodiments, the PIN may be verified by the initiator device 10A. For example, the PIN may be stored with the security features 74 (FIG. 2) in the storage 52 of the initiator device 10A. However, in other embodiments, the PIN may be stored on the transaction processing system 84 as part of the payer's account and verified by the transaction processing system 84 when the payment confirmation is transmitted to the transaction processing system 84.

After entry of the PIN, the device 10A may display the confirmation screen 170. The confirmation screen 170 may display the image 138 of the selected payment instrument and also may display a display window 172 that includes a prompt asking the user to confirm the payment transaction. In certain embodiments, the display window may display the amount of payment and the identity of the payment recipient. Instructions 174 may prompt the user to move a graphical element 176 to confirm the payment transaction. The depicted graphical element 176 includes a slide bar 178 that may be moved to the right or to the left using the touch screen 76 (FIG. 2). The slide bar 178 may slide along a track 180 between a decline position 182 and a confirmation position 184. Specifically, a user may drag the slide bar 178 to the left to the decline position 182 to decline the payment or the user may drag the slide bar 178 to the right to the confirmation position 184 to confirm the payment transaction.

The graphical element 178 may move across the confirmation screen 170 when the graphical element 178 is dragged by a user using the touch screen 176. For example, a user may use her finger or another object to move the graphical element 178 from a center position 186 to the confirmation position 184. In response to, or contemporaneously with, the movement, the device 10A may display a message 188 indicating that the payment has been confirmed. When the graphical element 178 reaches the confirmation position 184, the device 10A may transmit the payment confirmation to the transaction processing system 84, which in turn may complete the payment. Moreover, in certain embodiments, instead of, or in addition to the graphical element 178 that slides, a button, PIN, password, or other type of entry may be used to confirm the payment transaction.

After the payment is confirmed, a notification window 190 may be displayed on the confirmation screen 170. The notification window 190 may include the graphical elements 192 and 194. Specifically, the graphical element 192 may be selected by a user to view details of the payment transaction. For example, the details may include the name of the recipient, the payment method, and the payment amount. After the user has viewed any desired details, the user may select the graphical element 194 to exit the payment application.

Figure 7:
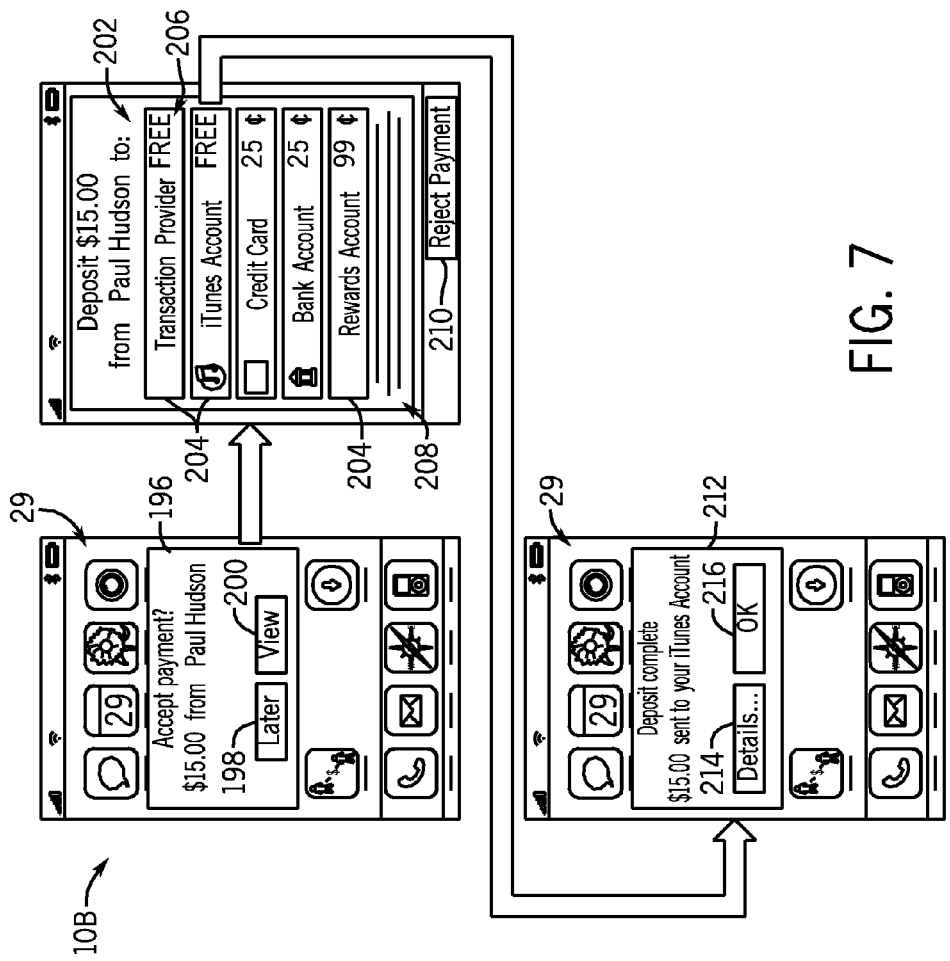
FIG. 7 is a view of screens of the device of FIG. 1 illustrating acceptance of a payment by a recipient in accordance with one embodiment.

FIG. 7 depicts the payment transaction from the recipient's point of view. The recipient may receive notification of the payment through the recipient device 10B. For example, a notification window 196 may be displayed on the home screen 29 of the recipient device 10B. The notification window 196 may notify the recipient that a payment has been made. The notification window 196 also may display details of the payment, such as the amount of the payment and the payer. However, in other embodiments, if the payer wishes to remain anonymous, the payer's identity may be omitted.

The notification window 196 includes graphical elements 198 and 200 that may be selected to accept or reject the payment. Specifically, the user may select the graphical element 198 to be reminded to view the payment details at a later point in time. If the user is ready to view the payment details, the user may select the graphical element 200 to display a deposit account selection screen 202. The deposit account selection screen may include selection bars 204 corresponding to the recipient's deposit accounts. For example, the recipient may have previously entered deposit account information with the transaction processing system 84. The selection bars also may include indicators 206 indicating the fee by the transaction process system 84 for depositing the payment into each respective account. For example, certain accounts, such as accounts maintained by the payment transaction provider, may be free while a small fee may be charged by other accounts. The deposit account may include financial accounts such as checking accounts, savings accounts, debit accounts, credit card accounts, or the like. Further, the deposit accounts may include non-financial accounts, such as an iTunes® account, or other type of rewards account, service account, or the like.

The deposit selection screen 202 also includes instructions 208 advising the user that if she accepts the payment her name may be sent to the sender for verification. To accept the payment, the recipient may select a deposit account using one of the selection bars 204. However, if the user wishes to reject the payment, the user may select the graphical element 210.

After selection of a deposit account through one of the selection bars 204, the recipient device 10B may transmit the corresponding account identifier to the transaction processing system 84 for completion of the payment. After the transaction processing system 84 has completed the payment, the transaction processing system 84 may transmit a completion notice to the recipient device 10B. For example, the notice may be displayed in a notification window 212 on a home screen 29 of the recipient device 10B. The notification window may notify the recipient that the deposit has been completed. In certain embodiments, the notification window may display details about the payment, such as the payment amount and the deposit account. The notification window 212 also may include graphical elements 214 and 216. Specifically, the graphical element 214 may be selected to view additional details about the payment. Once the recipient is satisfied with the details, the recipient may select the graphical element 216 to close the notification window 212.

Figure 8:
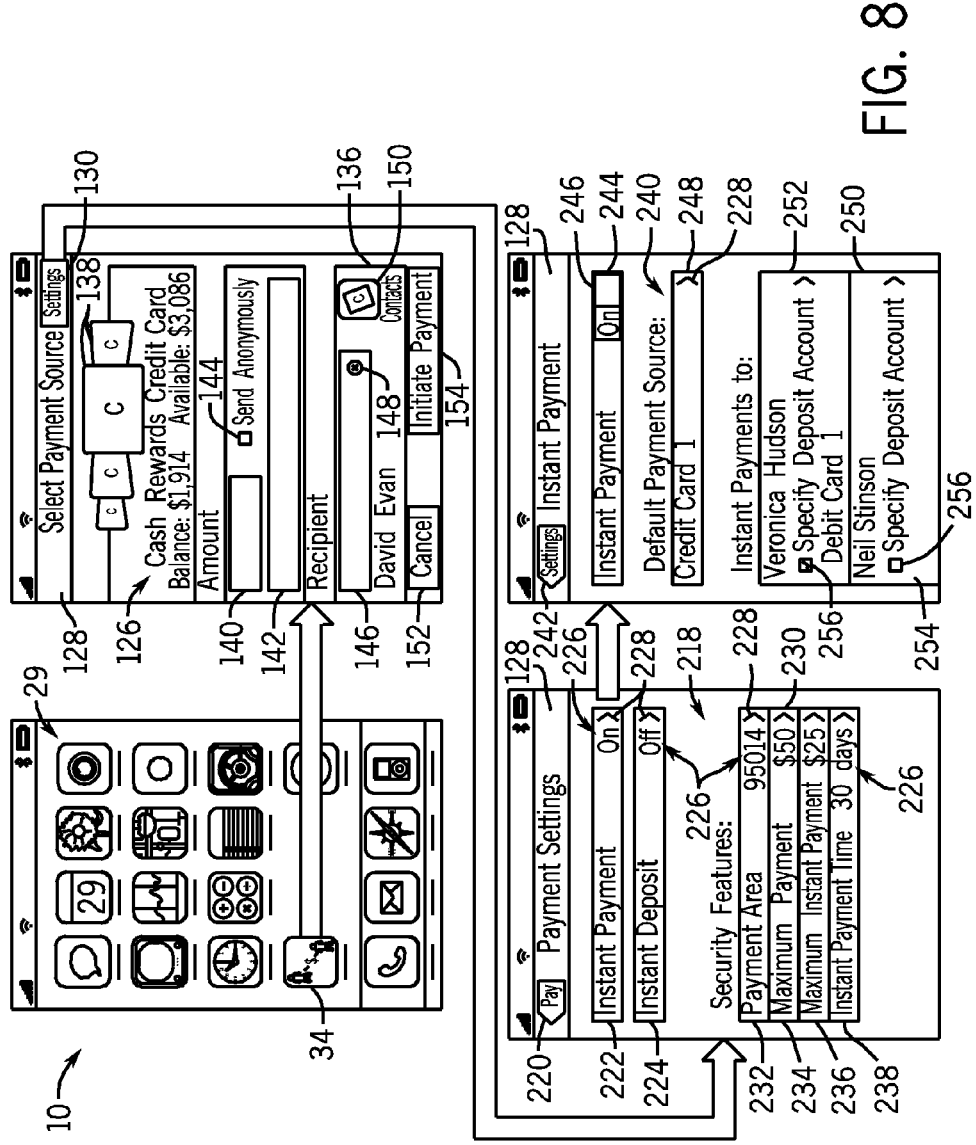
FIG. 8 is a view of screens of the device of FIG. 1 illustrating settings for a payment application in accordance with one embodiment.

FIG. 8 depicts a series of screen that may be used to adjust settings of the payment application. The settings may be stored as preferences within the payment preferences area 72 of the storage 54 as discussed above with respect to FIG. 2. The payment application may be opened by selecting the payments icon 34 shown on the home screen 29 of the electronic device 10. Upon selection of the payments icon 34, the payment application may open to the main screen 126. From the main screen 126, a settings screen 218 may be displayed in response to selection of the settings graphical element 130. Within the title bar 128 of the settings screen 218, a graphical element 220 may be selected to return to the main payments screen 126.

The settings screen 218 also includes selection bars 222 and 224 that may be selected to select instant payment and deposit settings for the payment application. Each selection bar 222 and 224 includes an indicator 226 showing the current status of the instant payment or instant deposit option. Arrows 228 within the selection bars 222 and 224 indicate that additional screens may be viewed by selecting the selection bars 222 and 224. Specifically, the selection bar 222 may be selected to change settings related to performing an instant payment. For example, in certain embodiments, after a payer and a recipient have made a payment transaction using the payment application, an instant payment option may be available.

The instant payment process may allow the verification process for completing the payment transaction to be reduced. For example, as shown in FIG. 3, during an instant payment, the payment initiation request 82 may be sent to the transaction processing system 84 and the payment notification 92 may be sent to the recipient device 10B. However, the payment confirmation 98 may not be transmitted to the initiator device 10A. Instead, the payment may be processed upon receiving the account identifier 94, without requiring additional confirmation of the recipient's identity from the payer. In other words, because the payer has previously confirmed the identity of the recipient in a prior transaction, the payment confirmation 98 may be bypassed for subsequent transactions.

The instant deposit option may be used to further reduce the verification process for receiving a payment. Specifically, the selection bar 224 may be selected to enable or disable the instant deposit feature. The instant deposit option may allow a payment recipient to specify a deposit account where payments may be deposited. In certain embodiments, different deposit account may be specified for different payers or a general deposit account may be specified for all payments being received. In these embodiments, if the payment initiator has enabled an instant payment and the payment recipient has enabled instant deposit, the payment may be processed with the payer only generating the payment initiation request 82, as shown in FIG. 3, with other requests or confirmations being either automated (e.g., performed without additional user inputs or feedback) or not performed. In other words, the payment may be processed without sending a payment notification 92 and without sending a payment confirmation request 98. Instead, the transaction processing system 84 may receive the account identifier 86, the recipient contact information 88, and the transaction information 90 from the initiating device 10A. Using this information, the transaction processing system 84 may determine the identity of the recipient. The transaction processing system 84 may then identify the account associated with the recipient and may retrieve the deposit account selected by the recipient for instant deposit payments. The transaction processing system may then process the transaction without requiring additional information from either the payment initiator or the payment recipient.

The instant payment option and/or the instant deposit option may be particularly useful for payers and recipients that complete frequent payment transactions with each other. For example, a parent and child may set up an instant payment and deposit for paying a child's weekly allowance. In another example, a parent may set up an instant payment to pay the monthly balance on a child's credit card. In a further example, coworkers who carpool may complete routine payments to pay for gas.

The settings screen 218 also includes a display window 230 that depicts several security settings that may be specified for the payment application. The display window 230 includes selection bars 232, 234, 236, and 238 that may be selected to adjust security settings. Specifically, the selection bar 232 may be selected to specify a location that the phone should be in when payments are made. The indicator within the selection bar currently shows a zip code indicating that the payments may be initiated when the electronic device 10 is located within that zip code. However, in other embodiments, the payment area may be specified by entering a street address, city, state, county, or the like.

The selection bar 234 may be selected to set a maximum payment value. For example, as shown, the maximum payment that may be made using the payment application has been set to fifty dollars. In certain embodiments, the security settings may be password or PIN protected. Further, the security settings may be selectable only by accessing the payer and recipient accounts stored by the transaction processing system 84. In other words, the security settings may not be changed from the GUI 28 of the electronic device 10, itself. However, in other embodiments, the security settings may be selected through the GUI 28 of the electronic device 10. Furthermore, certain security features may include a parental control feature that may allow a parent to set the security features for a child's phone.

The selection bar 236 may be selected to set a maximum instant payment amount. For example, the maximum instant payment amount may be set to a value, such as twenty-five dollars, to ensure that typographical errors do not result in an inadvertent payment of a large sum of money. Another security setting may allow a user to specify a time period for which instant payments may remain active. This setting may be selected through the selection bar 238 and may govern the frequency with which an instant payment must have been previously made to a recipient to allow instant payment to be available to that recipient. For example, as shown, the instant payment time is currently set to thirty days. In this example, the payment application may enable an instant payment option only when the payment initiator has made a payment to the selected recipient within the past thirty days. As may be appreciated, the security settings are provided by way of example only, and are not intended to be limiting. In other embodiments, additional types and/or combinations of security settings may be employed.

Upon selection of one of the selection bars 222, 224, 232, 234, 236, and 238, additional screens may be displayed. For example, as shown, selection of the instant payment selection bar 222 may cause an instant payments settings screen 240 to be displayed. The instant payment settings screen 240 includes a graphical icon 242 that may be selected to return to the main settings screen 218. The screen 240 also includes a selection bar 244 with a slide bar 246 that may be toggled to the right or left to enable or disable the instant payment option. The screen 240 also includes a selection bar 248 that may be selected to specify a default payment source. The default payment source may be shown on the main screen 126 upon selection of the payments icon 34.

The screen 240 also includes a display window 250 with selection bars 252 and 254 that correspond to currently available instant payment recipients. For each instant payment recipient, a deposit account may be selected through a selection box 256. For example, a parent may specify that instant payments to a child should be deposited into a selected account. However, in other embodiments no deposit account may be specified for the payment recipients.

Figure 9:
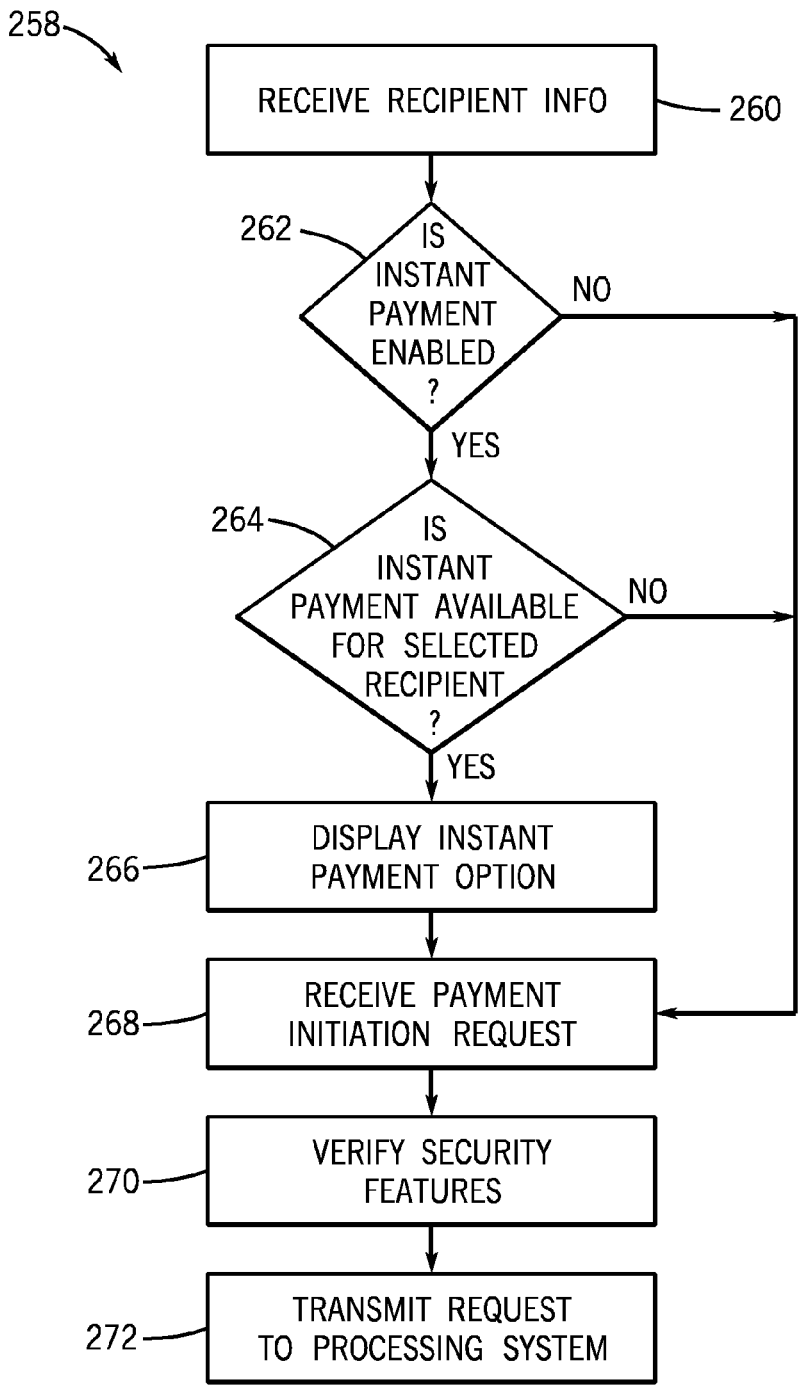
FIG. 9 is a flowchart depicting a method for conducting an instant payment in accordance with one embodiment.

FIG. 9 is a flowchart of one embodiment of a method 258 that may be employed by an electronic device 10 to perform an instant payment. The method may begin by receiving (block 260) a recipient's contact information. For example, a user may enter the contact information 88 through the main screen 126 of the payment application, as shown in FIG. 8. In certain embodiments, the payer may select the payment account, and enter the recipient contact information 88 and the transaction information 90 through the screen 126. The initiator device 10A may then determine (block 262) whether instant payment is enabled. If instant payment is enabled, the device 10A may then determine (block 264) whether the instant payment option is available for the selected recipient. For example, the device 10A may consult the stored preferences 72 (FIG. 2) to determine whether a previous payment has been completed between the payer and the recipient. In another example, the device 10A may transmit a query to the transaction processing system 84 to determine whether a previous payment has been competed between the payer and the recipient.

If the device 10A determines that the instant payment option is available, the device may then display (block 266) the instant payment options. For example, the device may show an instant payment selection box on the main screen 126. A user may select the instant payment option to perform an instant payment for this payment transaction, or may deselect the instant payment option to perform a full payment transaction as described above with respect to FIG. 4.

The device may receive (block 268) a payment initiation request through the main screen 126. For example, the device may receive a payment initiation request upon selection of the graphical element 154 shown in FIG. 8. After receiving the payment initiation request, the device may verify (block 270) security features. For example, the device 10 may determine whether the device 10 is located within an approved payment area. Further, the device may determine whether the payment amount is within the maximum payment limits specified by the settings. After verification of the security features, the device 10 may then transmit (block 272) the payment initiation request to the transaction processing system 84. In certain embodiments, the payment initiation request may include an indicator specifying whether instant payment should be employed for this payment transaction.

If the device determines (block 262) that instant payment is not enabled, the device may not display (block 266) the instant payment option and instead may wait to receive a payment initiation request. Furthermore, if the instant payment is enabled, but the instant payment option is not available for the selected recipient, the device 10 may not display (block 266) the instant payment option.

Figure 10:
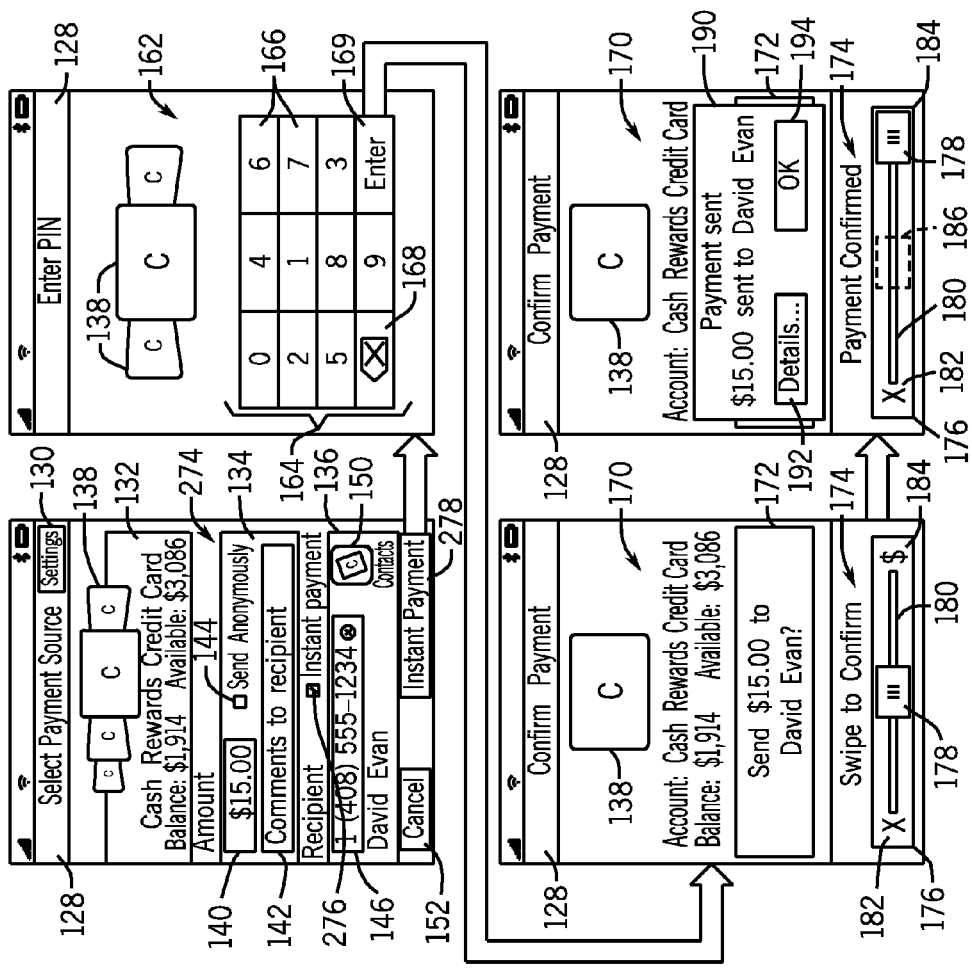
FIG. 10 is a view of screens of the device of FIG. 1 illustrating initiation of an instant payment transaction in accordance with one embodiment.

FIG. 10 depicts a series of screens that may be displayed by the initiator device 10A during an instant payment. To initiate an instant payment, the payer may enter the contact information 88 (FIG. 3) for the recipient into the selection box 146. Using the contact information 88, the initiation device 10A may determine whether the instant payment option is available for the selected recipient. If the instant payment option is available, the initiator device 10A may display an instant payment screen 274. The instant payment screen 274 is generally similar to the main screen 126 shown in FIG. 5. However, the instant payment screen 274 also includes an instant payment selection box 276. In certain embodiments, the instant payment selection box 276 may only appear when the instant payment option is available. However, in other embodiments, the instant payment selection box 276 may be shown but may be unselectable (i.e., grayed out) if the instant payment option is not available.

The payment initiator may select or deselect the instant payment selection box 276 to enable or disable the instant payment option for the specified recipient. The instant payment screen also includes a graphical element 278 that may be selected to initiate the instant payment. Upon selection of the instant payment graphical element 278, the PIN screen 162 may be displayed. After entry of the PIN, the payment confirmation screen 170 may be shown.

Differences between the instant payment process and the full payment process may be seen by comparing FIGS. 6 and 10. Specifically, as shown in FIG. 6, during the full payment process, a notification window 156 is displayed on the home screen 29 after a user selects the graphical element 154 (FIG. 5) to initiate the payment transaction. The payer may then confirm the payment through the graphical element 160 to confirm the payment and display the PIN screen 162. In contrast, during the instant payment process, selection of the graphical element 278 to initiate the payment transaction may cause the PIN screen 162 to be displayed. In other words, during the instant payment process, the notification window 156 (FIG. 6) may not be displayed to facilitate confirmation of the recipient's identity. Instead, the device may immediately display the PIN screen 162 because the recipient's identity has been confirmed in a previous payment transaction. The payer may then enter the PIN and confirm the payment through the confirmation screen 170, as described above with respect to FIG. 6. Upon confirmation, the initiator device 10A may display a notification window 190 indicating that the payment has been completed.

During the instant payment transaction, if the instant deposit option has not been enabled by the recipient, the recipient device 10B may display a series of screens similar to those shown in FIG. 7. Specifically, the initiator device 10B may display a notification window 200 that prompts the recipient to accept the payment and select a deposit account for the payment. However, if the recipient has enabled the instant deposit option, the transaction processing system 84 may process the payment using the deposit account specified with the instant deposit option. In these embodiments, the recipient device 10B may not display the notification window 200 or the deposit account selection screen 202. Instead, the recipient device 10B may display only the notification window 212, indicating that the payment has been completed.

Figure 11:
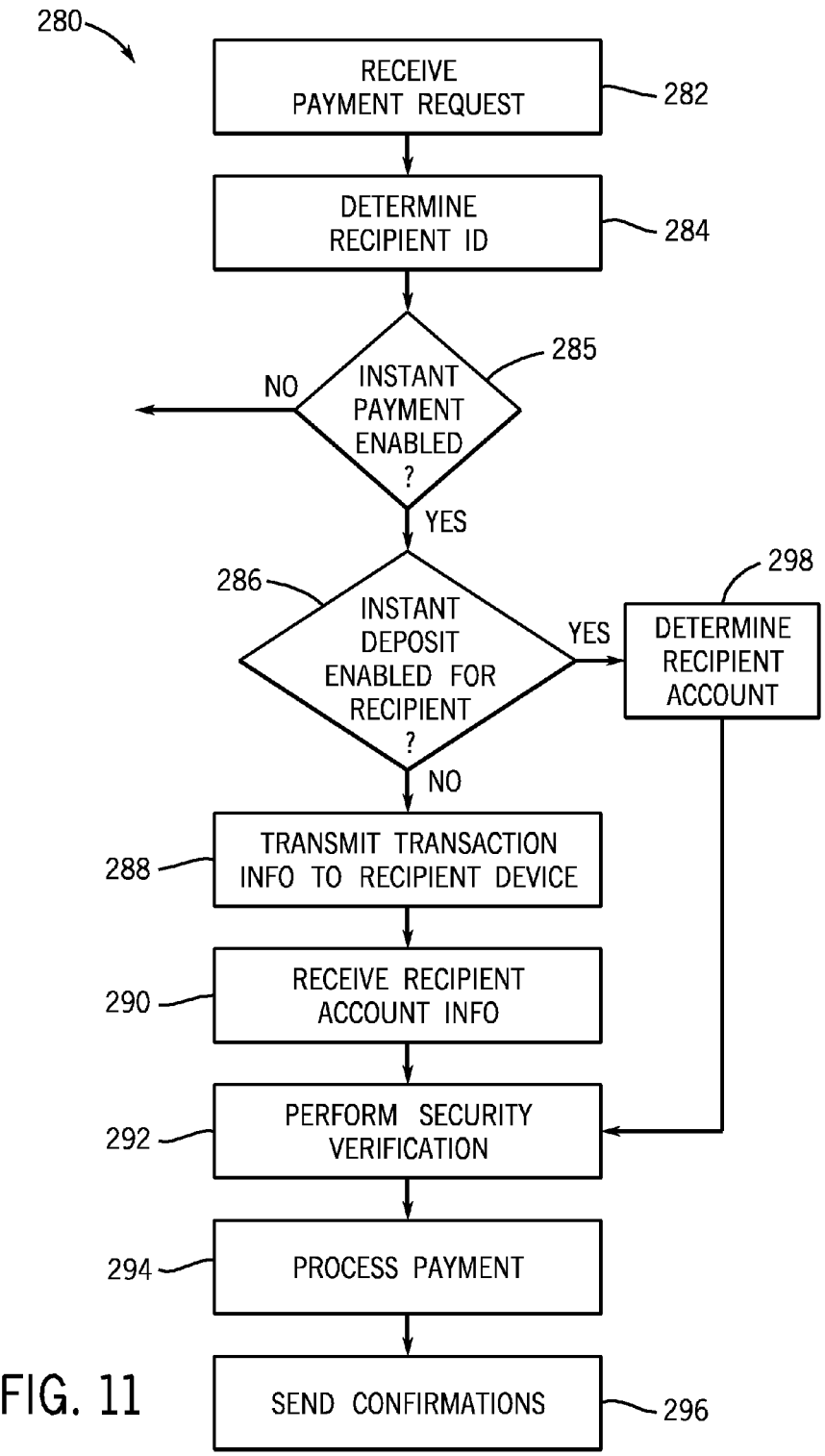
FIG. 11 is a flowchart depicting a method for conducting an instant payment transaction in accordance with one embodiment.

FIG. 11 is a flowchart of a method 280 that the transaction processing system may employ to perform an instant payment. The method may begin by receiving (block 282) an instant payment request. The transaction processing system may then determine (block 284) the identity of the recipient using the contact information 88 (FIG. 3) received with the instant payment request 92 (FIG. 3). For example, the transaction processing system 84 may use a phone number or email address provided by the payment initiator to determine the recipient's identity.

The transaction processing system 84 may then determine (block 285) whether the instant payment option is available for the selected recipient. First, the transaction processing system 84 may determine whether the payer has enabled instant payments. For example, the transaction processing system 84 may check the account of the payment initiator to determine whether the payment initiator has enabled instant payment, such as through the settings screen 218 (FIG. 8). In another example, the transaction processing system 84 may receive a notification with the payment initiation request 82 (FIG. 3) that indicates that instant payment has been enabled. The transaction processing system 84 may then determine whether the instant payment option is available for the selected recipient. For example, the transaction processing system 84 may determine whether a prior payment has been completed between the payer and the recipient. In other embodiments, the transaction processing system 84 may receive an instant payment enablement notification from the initiator device 10A with the payment initiation request 82 (FIG. 3).

If instant payment is not available for the selected recipient, the transaction processing system may proceed to perform the payment using the method 106 shown in FIG. 4. However, if instant payment has been enabled, the transaction processing center 84 may determine (block 286) whether the recipient has enabled instant deposit. For example, the transaction processing system 84 may check the account associated with the determined recipient identity to see if the recipient has enabled the instant deposit option. The transaction processing system 84 also may check the recipient's account to determine whether the recipient has specified a deposit account that corresponds to the payer.

If instant deposit has not been enabled, the transaction processing system 84 may transmit (block 288) the transaction information to the recipient device 10B in a payment notification 92 (FIG. 3). For example, the transaction information may be transmitted using the screens shown in FIG. 7. The recipient may then use the recipient device 10B to specify a deposit account that the recipient device 10B may transmit to the transaction processing system 84. After the transaction processing system 84 receives (block 290) the recipient account information, the transaction processing system may perform (block 292) a security verification, process (block 294) the payment, and send (block 296) confirmations as described above with respect to blocks 120, 122, and 124 of FIG. 4.

However, if instant deposit is enabled for the recipient, the transaction processing system 84 may determine (block 298) the deposit account for the instant deposit. For example, the transaction processing system 84 may use the determined identity of the recipient to find the recipient's payment account and retrieve the deposit account stored with that account. After determining (block 298) the deposit account, the transaction processing system 84 may proceed directly to performing (block 292) a security verification, without transmitting (block 288) the transaction information to the recipient device 10A or receiving (block 290) the recipient account information. The transaction processing system 84 may then process (block 294) the payment and send (block 296) payment confirmations.

Figure 12:
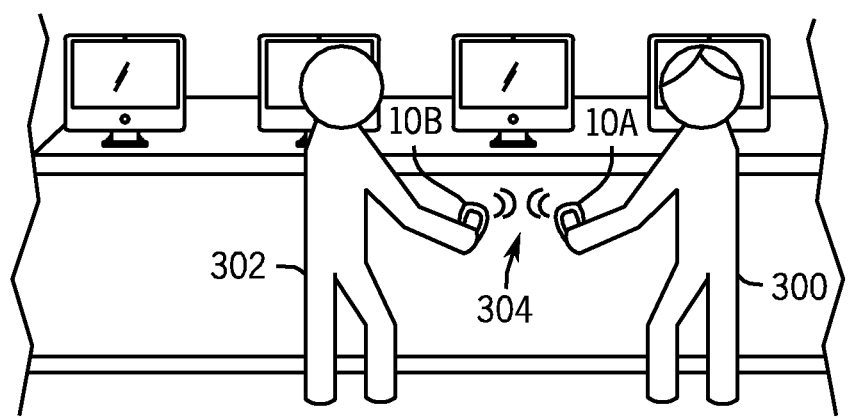
FIG. 12 is an illustration of initiation of a payment transaction using a close range communication between two electronic devices in accordance with one embodiment.
Figure 13:
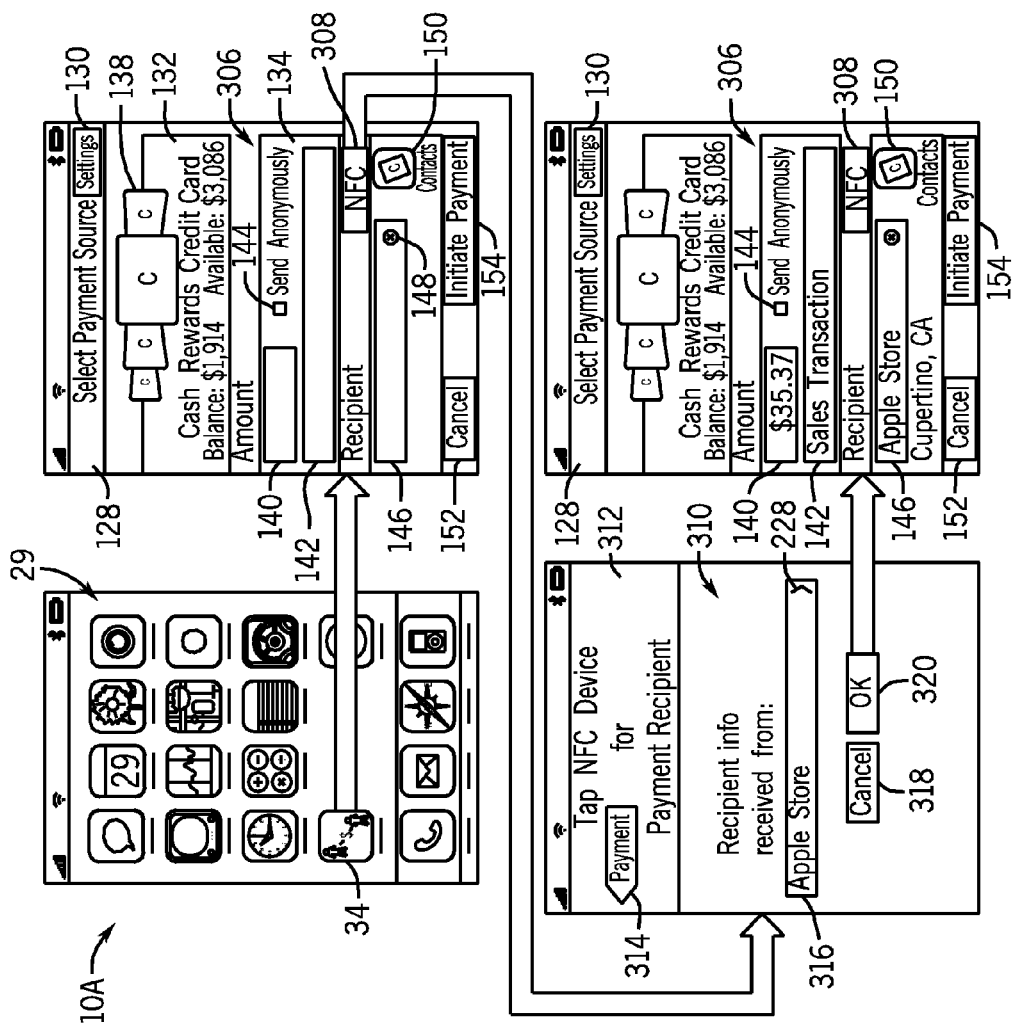
FIG. 13 is a view of screens of the device of FIG. 1 illustrating a payment transaction initiated using near field communication in accordance with one embodiment.
Figure 14:
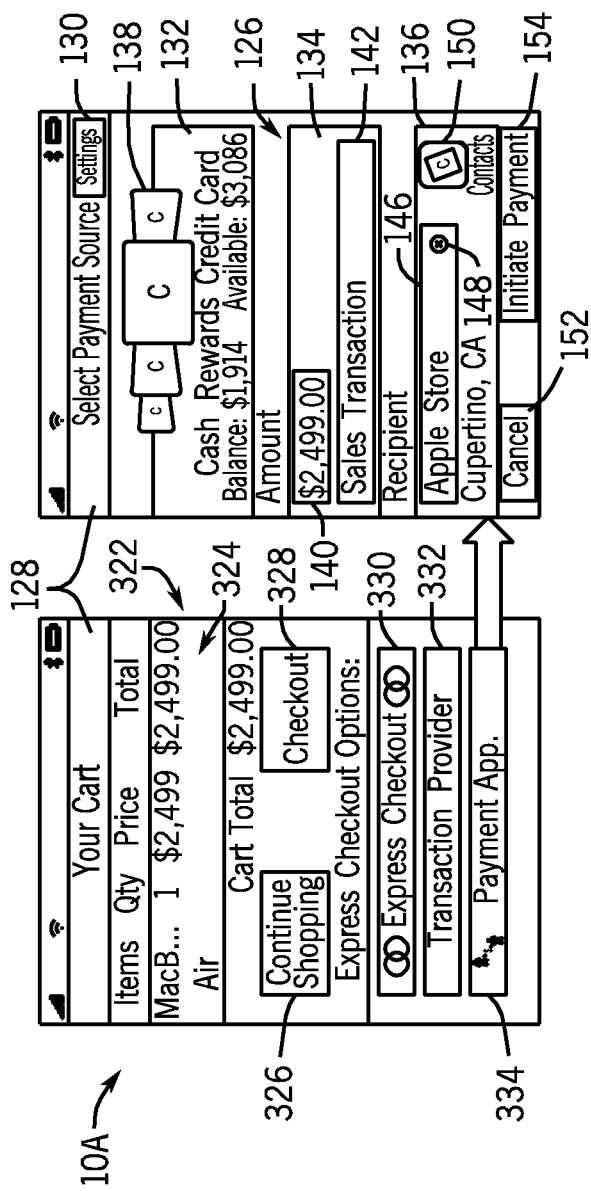
FIG. 14 is a view of screens of the device of FIG. 1 illustrating a payment transaction for online shopping in accordance with one embodiment.

As illustrated in FIGS. 5 and 10, payment transactions may be initiated by entering the information for the payment initiation request 92 through the main screen 126 (FIG. 5) and/or through the instant payments screen 274 (FIG. 10). FIGS. 12-14 depict additional ways to obtain the information for initiating payment transactions. The input techniques shown in FIGS. 12-14 may be used in place of, or in conjunction with, the screens 126 and 274.

As shown in FIG. 12, a short-range communication, such as near field communication enabled by the NFC interfaces 60, may be used to enter the recipient contact information into the initiator device 10A. For example, a payer 300 and a payment recipient 302 may bring the devices 10A and 10B within close proximity of each other to establish a communication link 304. In certain embodiments, the communication link 304 may represent a close range communication link, such as a near field communication link or a PAN communication link. Moreover, in certain embodiments, the communication link 304 may be used to exchange initial network configuration settings for establishing another communication link, such as a wireless network connection for exchanging the recipient contact information.

Using the communication link 304, the recipient device 10B may transmit payment information, such as recipient contact information 88 and/or a payment amount, to the initiator device 10A. The transmission of information over the communication link 304 may be particularly well suited to retail transactions. For example, a merchant 302 may have an account with the transaction processing system 84. The merchant 302 may transmit payment information for a sales order from the recipient device 10B to the initiator device 10A. The merchant also may transmit contact information 88 to the initiator device 10A. For example, the contact information 88 may include a unique identifier that enables the transaction processing system 84 to identify the retail merchant as the recipient of the payment from the initiator device 10A.

FIG. 13 depicts a series of screens for receiving recipient information through a short-range communication link as depicted in FIG. 12. A payer may launch the payment application by selecting the payments icon 34 from the home screen 29. Upon selection, a payment screen 306 may be displayed. The payment screen 306 may be generally similar to the main screen 126 shown in FIG. 5; however, the payment screen 306 may include a graphical element 308 for enabling a close range communication link, shown here as a near field communication link.

The payment initiator may select the graphical element 308 to display a screen 310 for enabling the close range communication link. The screen 310 may include an extended title bar 312 displaying instructions for establishing the close range communication link. In this case, the screen 310 may instruct the payment initiator to tap the initiator device 10A to the NFC device for the payment recipient. In certain embodiments, the NFC device may be the recipient electronic device 10B. However, in other embodiments, the NFC device may be a point of sale terminal or other electronic device, such as a computer terminal. The expanded title bar 312 also includes a graphical element 314 that may be used to cancel establishment of the close range communication link.

Upon establishing the close range communication link, the screen 310 may display the recipient information received over the communication link in a display area 316. In certain embodiments, the display area 316 may be selected to display additional information about the recipient, for example, the recipient's name and address. The screen 310 also includes a graphical element 318 that may be used to cancel the payment to the identified recipient.

To set the displayed recipient information as the contact information 88, the payer may select a graphical element 320 to return to the payment screen 306. As shown, the payment screen 306 has been populated with the payment information received over the closed range communication link. Specifically, the payment amount has been displayed in the input bar 140, comments have been included in the input bar 142, and the name of the recipient has been place in the input bar 146. In other embodiments, instead of, or in addition to an NFC communication link, the information may be received over a Wi-Fi connection, a PAN network, a WLAN network, or the like.

The payment information, such as the payment amount and the contact information, also may be populated through an online shopping application. FIG. 14 depicts a series of screens that may be used to make an online purchase using the payment application. For example, as shown in FIG. 14, the payer may use the initiator device 10A to perform online shopping using the initiator device 10A. In certain embodiments, the payer may connect to an online shopping website through one of the communication interfaces 56 and/or through a shopping application included on the initiator device 10A.

At checkout, the initiator device 10A may display a checkout screen 322 that displays a payment amount 324. The checkout screen 322 also may include graphical elements 326, 328, 330, and 332 that may be selected to checkout or to continue shopping. Furthermore, the checkout screen 322 may include a graphical element 334 that may be used to pay using the payment application. In response to selection of the payment application graphical element 334, the device 10A may display the main payment screen 126. Further, upon selection of the graphical element 334, the payment application may retrieve the payment information from the online merchant and display the information in the input bars 140, 142, and 146 on the main screen 126. For example, the screen 126 may display the payment amount 324 in the input bar 140. The screen 126 also may display the contact information for the online merchant in the selection bar 146.

If the payer approves the payment amount and the contact information shown on the main screen 126, the payer may select the graphical element 154 to initiate the payment transaction in the manner described above with respect to FIGS. 3-11. In certain embodiments, the payment application may allow instant payments and/or instant deposits to be performed for online transactions. For example, the main screen 126 may be replaced by the instant payment screen 274 shown in FIG. 10. In another example, the online merchant may enable instant deposit to direct all payments into a designated deposit account.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method, comprising:
   receiving, at a server, a payment initiation request from an initiator electronic device of a payer, wherein the payment initiation request specifies contact information for a recipient of a payment;
   determining, by the server, an identity of the recipient and an associated recipient electronic device based on the received contact information;
   obtaining, by the server, a payment account record of the payer associated with the initiator electronic device;
   based on the payment account record of the payer, determining, by the server, that a first payment transaction was completed between the payer and the recipient that involved a verification step, wherein the verification step includes a confirmation of the identity of the recipient from the initiator electronic device;
   bypassing the verification step for a second payment transaction based on the determination that the first payment transaction completed between the payer and the recipient involved the verification step to confirm the identity of the recipient, wherein the first payment transaction and the second payment transaction are independent transactions other than the identities of the payer and the recipient; and
   transmitting, by the server, a payment notification to the recipient electronic device associated with the identity of the recipient to obtain acceptance of the payment from the recipient without verifying the identity of the recipient.

2. The method of claim 1, wherein the contact information comprises a telephone number or an email address.

3. The method of claim 1, wherein transmitting a payment notification comprises transmitting a request for an account identifier associated with an account for depositing the payment.

4. The method of claim 3, wherein receiving the account identifier associated with the account for depositing the payment is acceptance of the payment.

5. The method of claim 1, wherein at least one of receiving a payment initiation request, transmitting a payment notification, or transmitting the identity to the initiator electronic device is performed through a push notification service.

6. The method of claim 1, wherein bypassing the transaction verification step only occurs when a prior payment transaction and the second payment transaction were completed within a specified time period.

7. The method of claim 6 wherein bypassing the transaction verification step for the second payment transaction is based on the determination that the location of the electronic device is within a payer's user preference, the payer's user preference being selected from the group consisting of zip code, street address, city, state, and country.

8. The method of claim 1, wherein the independent transactions are for paying, at a predefined time interval, the recipient's allowance, paying a balance on the recipient's credit card, or paying the recipient for gas used during carpooling.

9. The method of claim 8, wherein the payment account is a non-financial account.

10. A non-transitory computer-readable medium comprising one or more sequences of instructions which, when executed by one or more processors, cause the one or more processors to:
    receive, from an initiator electronic device, a payment request specifying a payment from a payer to a recipient, wherein the recipient is specified by contact information included within the payment request;
    determine an identity of the recipient based on the contact information received;
    obtain a payment account record of the payer associated with the initiator electronic device;
    based on the payment account record, determine that a first payment transaction was completed between the payer and the recipient that involved a verification step, wherein the verification step includes a confirmation of the identity of the recipient from the initiator electronic device;
    bypassing the verification step for a second payment transaction based on the determination that the first payment transaction completed between the payer and the recipient involved the verification step to confirm the identity of the recipient, wherein the first payment transaction and the second payment transaction are independent transactions other than the identities of the payer and the recipient; and
    processing the payment without confirming the identity of the recipient.

11. The non-transitory computer-readable medium of claim 10, wherein the instructions that cause determining an identity of the recipient comprises instructions that cause retrieving the identity from a payment transaction account associated with the contact information.

12. The non-transitory computer-readable medium of claim 10, wherein the instructions that cause determining that a prior payment transaction was completed between the payer and the recipient that involved a verification step to confirm the identity of the recipient comprises instructions that cause determining whether a prior payment transaction has been completed using the initiator electronic device and a recipient electronic device associated with the recipient.

13. The non-transitory computer-readable medium of claim 10, wherein the instructions cause transmitting a request to a recipient electronic device associated with the contact information, wherein the request prompts the recipient to specify a recipient account to receive the payment.

14. A method for initiating a payment transaction using an electronic device, the method comprising:
    displaying on the electronic device a payment transactions screen to facilitate entry of payment transaction information by a payer;
    acquiring contact information for a payment recipient from input at the electronic device;
    obtaining a payment account record of the payer associated with the electronic device;
    based on the payment account record of the payer, receiving from a transaction processing system a determination that a first payment transaction was completed between the payer and the payment recipient, the first payment transaction involving a verification step, wherein the verification step includes a confirmation of the identity of the payment recipient from the electronic device;
    bypassing the verification determination for a second payment transaction based on the determination that the first payment transaction completed between the payer and the payment recipient involved the verification step to confirm the identity of the payment recipient, wherein the first payment transaction and the second payment transaction are independent transactions other than the identities of the payer and the payment recipient;

displaying an instant payment selection option on the payment transactions screen based on the determination that the first payment transaction completed between the payer and the payment recipient involved the verification step to confirm the identity of the payment recipient; and transmitting the second payment transaction information and the contact information to the transaction processing system to process a payment to the payment recipient.

15. The method of claim 14, wherein acquiring contact information comprises retrieving contact information for the payment recipient from an electronic address book stored on the electronic device, on the transaction processing system, and/or on an external server.

16. The method of claim 14, wherein acquiring contact information comprises receiving a unique identifier through a near field communication interface.

17. The method of claim 14, wherein acquiring contact information comprises receiving a unique identifier for an online merchant through a network interface.

18. The method of claim 14, wherein transmitting the payment transaction information and the contact information comprises determining a location of the electronic device and verifying that the location corresponds to a stored location for conducting payment transactions.

19. The method of claim 18, wherein the location of the electronic device is determined via a positioning system of the electronic device, the positioning system being selected from the group consisting of GPS, cell tower positioning, and Wi-Fi location identification.

20. An electronic device, comprising:
an input device configured to receive a user input identifying contact information for a payment recipient;
a display;
a communication interface; and
data processing circuitry configured to:
obtain a payment account record of a payer from the received user input,
receive, from a payment transaction processing system, a determination that a first payment transaction was completed between the payer and the payment recipient that involved a verification step, wherein the verification step includes a confirmation of the identity of the payment recipient from the input device,
bypass the verification determination for a second payment transaction when the first payment transaction completed between the payer and the payment recipient involved the verification step to confirm the identity of the payment recipient, wherein the first payment transaction and the second payment transaction are independent transactions other than the identities of the payer and the payment recipient, and
transmit the contact information received through the input device to the payment transaction processing system through the communication interface to process a payment to the payment recipient.

21. The electronic device of claim 20, wherein the input device comprises a touch screen and wherein the communication interface comprises a push notification service interface.

22. The electronic device of claim 20, wherein the data processing circuitry is configured to cause the display to present a graphical user interface that provides graphical elements to facilitate user selection of the contact information.

23. The electronic device of claim 20, further comprising a computer-readable medium that includes a data storage structure storing previously approved contact information, and wherein the data processing circuitry is capable of determining whether the received contact information corresponds to the previously approved contact information.

24. The electronic device of claim 20, comprising a near field communication interface, and wherein the data processing circuitry is capable of receiving the contact information from another electronic device via the near field communication interface.

25. The electronic device of claim 20, wherein the data processing circuitry is configured to determine whether a previous payment has been completed for the payment recipient to determine whether an instant payment option is available for the payment recipient.

26. The electronic device of claim 20, wherein the data processing circuitry is configured to receive an identity of a payment recipient acquired by the payment transaction processing system based on the contact information, and cause the display to display the identity and prompt a user to confirm a payment to the payment recipient based on the displayed identity, in response to determining that an instant payment is not available for the payment recipient.

* * * * *